US009451020B2

(12) United States Patent
Liu et al.

(10) Patent No.: US 9,451,020 B2
(45) Date of Patent: Sep. 20, 2016

(54) DISTRIBUTED COMMUNICATION OF INDEPENDENT AUTONOMOUS VEHICLES TO PROVIDE REDUNDANCY AND PERFORMANCE

(71) Applicants: Dongxia Liu, Mill Creek, WA (US); Hairong Lei, San Jose, CA (US); Raj Abhyanker, Cupertino, CA (US)

(72) Inventors: Dongxia Liu, Mill Creek, WA (US); Hairong Lei, San Jose, CA (US); Raj Abhyanker, Cupertino, CA (US)

(73) Assignee: LEGALFORCE, INC., Mountain View, CA (US)

( * ) Notice: Subject to any disclaimer, the term of this patent is extended or adjusted under 35 U.S.C. 154(b) by 125 days.

(21) Appl. No.: 14/334,674

(22) Filed: Jul. 18, 2014

(65) Prior Publication Data

US 2016/0021178 A1 Jan. 21, 2016

(51) Int. Cl.
*H04L 29/08* (2006.01)
*H04L 12/24* (2006.01)
*H04W 76/02* (2009.01)
*H04W 84/18* (2009.01)

(52) U.S. Cl.
CPC ........... *H04L 67/1042* (2013.01); *H04L 41/06* (2013.01); *H04L 67/12* (2013.01); *H04W 76/02* (2013.01); *H04W 84/18* (2013.01)

(58) Field of Classification Search
None
See application file for complete search history.

(56) References Cited

U.S. PATENT DOCUMENTS 2,035,218 A 3/1936 Bloom
3,253,806 A 5/1966 Eickmann
3,556,438 A 1/1971 Meditz
3,762,669 A 10/1973 Curci
4,119,163 A 10/1978 Ball
4,161,843 A 7/1979 Hui (Continued)

FOREIGN PATENT DOCUMENTS

EP 1426876 A1 6/2004
KR 101069834 B1 10/2010
KR 1020120121376 A 7/2012
WO 9808055 A1 2/1998
WO 9956143 A1 11/1999

(Continued)

OTHER PUBLICATIONS

Benchmark-Backed Nextdoor Launches As a Private Social Network for Neighborhoods, Techcrunch Article, Oct. 26, 2011 by Leena Rao (6 Pages) http://techcrunch.com/2011/10/26/benchmark-backed-nextdoor-launches-as-a-private-social-network-for-neighborhoods/.

(Continued)

*Primary Examiner* — Diane Lo
(74) *Attorney, Agent, or Firm* — Raj Abhyanker, P.C.

(57) ABSTRACT

A method and system of distributed communication of independent autonomous vehicles to provide redundancy and performance are disclosed. In one embodiment, a set of autonomous vehicles operates in a geographically proximate area through which peer-to-peer communication sessions are established between nearby ones of the set of autonomous vehicles through an ad-hoc network based on a present geo-spatial location of each one of the set of autonomous vehicles in communication proximity to preferred adjacent ones of the set of autonomous vehicles. A central server directly coupled to each of the set of autonomous vehicles establishes centralized communication paths with each of the set of autonomous vehicles through a wide area network. The centralized server processes a communication from adjacent ones of the set of autonomous vehicles when an error condition is detected in an operational mode of a non-functional vehicle that has lost communication with the central server.

51 Claims, 9 Drawing Sheets

(56) References Cited

U.S. PATENT DOCUMENTS 4,375,354 A 3/1983 Henriksson
4,556,198 A 12/1985 Tominaga
4,779,203 A 10/1988 McClure et al.
4,914,605 A 4/1990 Loughmiller, Jr. et al.
4,996,468 A 2/1991 Field et al.
5,032,989 A 7/1991 Tornetta
5,050,844 A 9/1991 Hawk
5,199,686 A 4/1993 Fletcher
5,208,750 A 5/1993 Kurami et al.
5,325,294 A 6/1994 Keene
5,372,211 A 12/1994 Wilcox et al.
5,521,817 A 5/1996 Burdoin et al.
5,577,567 A 11/1996 Johnson et al.
5,581,630 A 12/1996 Bonneau, Jr.
5,584,025 A 12/1996 Keithley et al.
5,590,062 A 12/1996 Nagamitsu et al.
5,617,319 A 4/1997 Arakawa et al.
5,630,103 A 5/1997 Smith et al.
5,671,342 A 9/1997 Millier et al.
5,720,363 A 2/1998 Kipp
5,751,245 A 5/1998 Janky et al.
5,774,133 A 6/1998 Neave et al.
5,794,207 A 8/1998 Walker et al.
5,805,810 A 9/1998 Maxwell
5,819,269 A 10/1998 Uomini
5,826,244 A 10/1998 Huberman
5,831,664 A 11/1998 Wharton et al.
5,835,896 A 11/1998 Fisher et al.
5,852,810 A 12/1998 Sotiroff et al.
5,904,214 A 5/1999 Lin
5,905,499 A 5/1999 McDowall et al.
5,907,322 A 5/1999 Kelly et al.
5,926,765 A 7/1999 Sasaki
5,930,474 A 7/1999 Dunworth et al.
5,937,413 A 8/1999 Hyun et al.
5,940,806 A 8/1999 Danial
5,991,737 A 11/1999 Chen
6,024,288 A 2/2000 Gottlich et al.
6,029,141 A 2/2000 Bezos et al.
6,029,195 A 2/2000 Herz
6,034,618 A 3/2000 Tatebayashi et al.
6,036,601 A 3/2000 Heckel
6,047,194 A 4/2000 Andersson
6,047,236 A 4/2000 Hancock et al.
6,049,778 A 4/2000 Walker et al.
6,059,263 A 5/2000 Otema et al.
6,073,138 A 6/2000 de l'Etraz et al.
6,078,906 A 6/2000 Huberman
6,088,702 A 7/2000 Plantz et al.
6,092,076 A 7/2000 McDonough et al.
6,092,105 A 7/2000 Goldman
6,101,484 A 8/2000 Halbert et al.
6,108,639 A 8/2000 Walker et al.
6,122,592 A 9/2000 Arakawa et al.
6,134,486 A 10/2000 Kanayama
6,148,260 A 11/2000 Musk et al.
6,148,289 A 11/2000 Virdy
6,175,831 B1 1/2001 Weinreich et al.
6,199,076 B1 3/2001 Logan et al.
6,229,533 B1 5/2001 Farmer et al.
6,236,990 B1 5/2001 Geller et al.
6,269,369 B1 7/2001 Robertson
6,308,177 B1 10/2001 Israni et al.
6,317,718 B1 11/2001 Fano
6,336,111 B1 1/2002 Ashby et al.
6,339,745 B1 1/2002 Novik
6,356,834 B2 3/2002 Hancock et al.
6,381,537 B1 4/2002 Chenault et al.
6,401,085 B1 6/2002 Gershman et al.
6,405,123 B1 6/2002 Rennard et al.
6,408,307 B1 6/2002 Semple et al.
6,445,983 B1 9/2002 Dickson et al.
6,453,339 B1 9/2002 Schultz et al.
6,470,268 B1 10/2002 Ashcraft et al.
6,480,885 B1 11/2002 Olivier
6,487,583 B1 11/2002 Harvey et al.
6,498,982 B2 12/2002 Bellesfield et al.
6,507,776 B1 1/2003 Fox, III
6,513,069 B1 1/2003 Abato et al.
6,519,629 B2 2/2003 Harvey et al.
6,532,007 B1 3/2003 Matsuda
6,542,813 B1 4/2003 Kovacs
6,542,817 B2 4/2003 Miyaki
6,542,936 B1 4/2003 Mayle et al.
6,557,013 B1 4/2003 Ziff et al.
6,587,787 B1 7/2003 Yokota
6,597,983 B2 7/2003 Hancock
6,600,418 B2 7/2003 Francis et al.
6,611,751 B2 8/2003 Warren
6,615,039 B1 9/2003 Eldering
6,622,086 B2 9/2003 Polidi
6,629,136 B1 9/2003 Naidoo
6,633,311 B1 10/2003 Douvikas et al.
6,636,803 B1 10/2003 Hartz, Jr. et al.
6,640,187 B1 10/2003 Chenault et al.
6,643,663 B1 11/2003 Dabney et al.
6,646,568 B2 11/2003 MacPhail et al.
6,647,383 B1 11/2003 August et al.
6,654,800 B1 11/2003 Rieger, III
6,658,410 B1 12/2003 Sakamaki et al.
6,662,016 B1 12/2003 Buckham et al.
6,672,601 B1 1/2004 Hofheins et al.
6,677,894 B2 1/2004 Sheynblat et al.
6,684,196 B1 1/2004 Mini et al.
6,687,878 B1 2/2004 Eintracht et al.
6,691,105 B1 2/2004 Virdy
6,691,114 B1 2/2004 Nakamura
6,711,414 B1 3/2004 Lightman et al.
6,716,101 B1 4/2004 Meadows et al.
6,719,570 B2 4/2004 Tsuchioka
6,721,748 B1 4/2004 Knight et al.
6,728,635 B2 4/2004 Hamada et al.
6,745,196 B1 6/2004 Colyer et al.
6,750,881 B1 6/2004 Appelman
6,798,407 B1 9/2004 Benman
6,816,850 B2 11/2004 Culliss
6,819,267 B1 11/2004 Edmark et al.
6,834,229 B2 12/2004 Rafiah et al.
6,847,823 B2 1/2005 Lehikoinen et al.
6,871,140 B1 3/2005 Florance et al.
6,882,307 B1 4/2005 Gifford
6,883,748 B2 4/2005 Yoeli
6,889,213 B1 5/2005 Douvikas et al.
6,907,405 B2 6/2005 Brett
6,918,576 B2 7/2005 Finkbeiner
6,926,233 B1 8/2005 Corcoran, III
6,931,419 B1 8/2005 Lindquist
6,950,791 B1 9/2005 Bray et al.
6,963,879 B2 11/2005 Colver et al.
6,968,179 B1 11/2005 De Vries
6,968,513 B1 11/2005 Rinebold et al.
6,974,123 B2 12/2005 Latvys
6,976,031 B1 12/2005 Toupal et al.
6,978,284 B2 12/2005 McBrearty et al.
6,983,139 B2 1/2006 Dowling et al.
6,987,976 B2 1/2006 Kohar et al.
7,006,881 B1 2/2006 Hoffberg et al.
7,013,292 B1 3/2006 Hsu et al.
7,024,397 B1 4/2006 Donahue
7,024,455 B2 4/2006 Yokobori et al.
7,038,681 B2 5/2006 Scott et al.
7,047,202 B2 5/2006 Jaipuria et al.
7,050,909 B2 5/2006 Nichols et al.
7,068,309 B2 6/2006 Toyama et al.
7,069,308 B2 6/2006 Abrams
7,072,849 B1 7/2006 Filepp et al.
7,076,409 B2 7/2006 Agrawala et al.
7,076,741 B2 7/2006 Miyaki
7,079,943 B2 7/2006 Flann et al.
7,080,019 B1 7/2006 Hurzeler
7,080,096 B1 7/2006 Imamura
7,085,650 B2 8/2006 Anderson
7,099,745 B2 8/2006 Ebert
7,099,862 B2 8/2006 Fitzpatrick et al.

(56) References Cited

U.S. PATENT DOCUMENTS 7,117,254 B2 10/2006 Lunt et al.
7,130,702 B2 10/2006 Morrell
7,136,915 B2 11/2006 Rieger, III
7,155,336 B2 12/2006 Dorfman et al.
7,158,878 B2 1/2007 Rasmussen et al.
7,174,301 B2 2/2007 Florance et al.
7,177,872 B2 2/2007 Schwesig et al.
7,178,720 B1 2/2007 Strubbe et al.
7,184,990 B2 2/2007 Walker et al.
7,188,056 B2 3/2007 Kagarlis
7,188,080 B1 3/2007 Walker et al.
7,188,153 B2 3/2007 Lunt et al.
7,209,803 B2 4/2007 Okamoto et al.
7,218,993 B2 5/2007 Yasukawa et al.
7,228,232 B2 6/2007 Bodin et al.
7,233,942 B2 6/2007 Nye
7,249,123 B2 7/2007 Elder et al.
7,249,732 B2 7/2007 Sanders, Jr. et al.
7,251,647 B2 7/2007 Hoblit
7,254,559 B2 8/2007 Florance et al.
7,269,590 B2 9/2007 Hull et al.
7,293,019 B2 11/2007 Dumais et al.
7,296,026 B2 11/2007 Patrick et al.
7,306,186 B2 12/2007 Kusic
7,324,810 B2 1/2008 Nave et al.
7,343,564 B2 3/2008 Othmer
7,353,034 B2 4/2008 Haney
7,353,114 B1 4/2008 Rohlf et al.
7,353,199 B1 4/2008 DiStefano, III
7,359,871 B1 4/2008 Paasche et al.
7,359,894 B1 4/2008 Liebman et al.
7,373,244 B2 5/2008 Kreft
7,375,618 B2 5/2008 Quintos
7,383,251 B2 6/2008 Might
7,386,542 B2 6/2008 Maybury et al.
7,389,210 B2 6/2008 Kagarlis
7,424,438 B2 9/2008 Vianello
7,424,541 B2 9/2008 Bourne
7,426,970 B2 9/2008 Olsen
7,433,832 B1 10/2008 Bezos et al.
7,433,868 B1 10/2008 Satomi et al.
7,437,368 B1 10/2008 Kolluri et al.
7,441,031 B2 10/2008 Shrinivasan et al.
7,444,241 B2 10/2008 Grimm
7,447,509 B2 11/2008 Cossins et al.
7,447,685 B2 11/2008 Nye
7,447,771 B1 11/2008 Taylor
7,454,524 B2 11/2008 Jeong
7,475,953 B2 1/2009 Osborn et al.
7,477,285 B1 1/2009 Johnson
7,478,324 B1 1/2009 Ohtsu
7,480,867 B1 1/2009 Racine et al.
7,483,960 B2 1/2009 Kyusojin
7,487,114 B2 2/2009 Florance et al.
7,496,603 B2 2/2009 Deguchi et al.
7,500,258 B1 3/2009 Eldering
7,505,919 B2 3/2009 Richardson
7,505,929 B2 3/2009 Angert et al.
7,520,466 B2 4/2009 Bostan
7,525,276 B2 4/2009 Eaton
7,561,169 B2 7/2009 Carroll
7,562,023 B2 7/2009 Yamamoto
7,580,862 B1 8/2009 Montelo et al.
7,581,702 B2 9/2009 Olson et al.
7,587,276 B2 9/2009 Gold et al.
7,596,511 B2 9/2009 Hall et al.
7,599,795 B1 10/2009 Blumberg et al.
7,599,935 B2 10/2009 La Rotonda et al.
7,617,048 B2 11/2009 Simon et al.
7,636,687 B2 12/2009 Foster et al.
7,640,204 B2 12/2009 Florance et al.
7,658,346 B2 2/2010 Goossen
7,668,405 B2 2/2010 Gallagher
7,669,123 B2 2/2010 Zuckerberg et al.
7,680,673 B2 3/2010 Wheeler
7,680,859 B2 3/2010 Schiller
7,693,953 B2 4/2010 Middleton et al.
7,702,545 B1 4/2010 Compton et al.
7,725,492 B2 5/2010 Sittig et al.
7,734,254 B2 6/2010 Frost et al.
7,751,971 B2 7/2010 Chang et al.
7,761,789 B2 7/2010 Erol et al.
7,792,815 B2 9/2010 Aravamudan et al.
7,797,256 B2 9/2010 Zuckerberg et al.
7,801,542 B1 9/2010 Stewart
7,802,290 B1 9/2010 Bansal et al.
7,808,378 B2 10/2010 Hayden
7,809,709 B1 10/2010 Harrison, Jr.
7,809,805 B2 10/2010 Stremel et al.
7,810,037 B1 10/2010 Edwards et al.
7,812,717 B1 10/2010 Cona et al.
7,823,073 B2 10/2010 Holmes et al.
7,827,052 B2 11/2010 Scott et al.
7,827,120 B1 11/2010 Evans et al.
7,827,208 B2 11/2010 Bosworth et al.
7,827,265 B2 11/2010 Cheever et al.
7,831,917 B1 11/2010 Karam
7,840,224 B2 11/2010 Vengroff et al.
7,840,319 B2 11/2010 Zhong
7,840,558 B2 11/2010 Wiseman et al.
7,848,765 B2 12/2010 Phillips et al.
7,853,518 B2 12/2010 Cagan
7,853,563 B2 12/2010 Alvarado et al.
7,860,889 B1 12/2010 Martino et al.
7,870,199 B2 1/2011 Galli et al.
7,873,471 B2 1/2011 Gieseke
7,881,864 B2 2/2011 Smith
7,886,024 B2 2/2011 Kelly et al.
7,894,933 B2 2/2011 Mountz et al.
7,894,939 B2 2/2011 Zini et al.
7,894,981 B2 2/2011 Yamane et al.
7,904,366 B2 3/2011 Pogust
7,913,179 B2 3/2011 Sheha et al.
7,933,808 B2 4/2011 Garcia
7,933,810 B2 4/2011 Morgenstern
7,945,653 B2 5/2011 Zuckerberg et al.
7,949,714 B1 5/2011 Burnim
7,958,011 B1 6/2011 Cretney et al.
7,961,986 B1 6/2011 Jing et al.
7,962,281 B2 6/2011 Rasmussen et al.
7,966,567 B2 6/2011 Abhyanker
7,969,606 B2 6/2011 Chu
7,970,657 B2 6/2011 Morgenstern
7,980,808 B2 7/2011 Chilson et al.
7,991,703 B1 8/2011 Watkins
7,996,109 B2 8/2011 Zini et al.
7,996,270 B2 8/2011 Sundaresan
8,010,230 B2 8/2011 Zini et al.
8,027,943 B2 9/2011 Juan et al.
8,046,309 B2 10/2011 Evans et al.
8,051,089 B2 11/2011 Gargi et al.
8,060,389 B2 11/2011 Johnson
8,060,555 B2 11/2011 Grayson et al.
8,064,590 B2 11/2011 Abhyanker
8,065,291 B2 11/2011 Knorr
8,095,430 B2 1/2012 Abhyanker
8,103,734 B2 1/2012 Galli et al.
8,107,879 B2 1/2012 Pering et al.
8,108,501 B2 1/2012 Birnie et al.
8,112,419 B2 2/2012 Hancock et al.
8,117,486 B2 2/2012 Handley
8,136,145 B2 3/2012 Fetterman et al.
8,139,514 B2 3/2012 Weber et al.
8,145,661 B1 3/2012 Billman et al.
8,145,703 B2 3/2012 Frishert et al.
8,149,113 B2 4/2012 Diem
8,167,234 B1 5/2012 Moore
8,171,128 B2 5/2012 Zuckerberg et al.
8,190,357 B2 5/2012 Abhyanker et al.
8,190,476 B2 5/2012 Urbanski et al.
8,195,601 B2 6/2012 Law et al.
8,195,744 B2 6/2012 Julia et al.
8,204,624 B2 6/2012 Zini et al.
8,204,776 B2 6/2012 Abhyanker

(56) References Cited

U.S. PATENT DOCUMENTS 8,204,952 B2 6/2012 Stremel et al.
8,223,012 B1 7/2012 Diem
8,225,376 B2 7/2012 Zuckerberg et al.
8,229,470 B1 7/2012 Ranjan et al.
8,249,943 B2 8/2012 Zuckerberg et al.
8,271,057 B2 9/2012 Levine et al.
8,275,546 B2 9/2012 Xiao et al.
8,290,943 B2 10/2012 Carbone et al.
8,292,215 B2 10/2012 Olm et al.
8,296,373 B2 10/2012 Bosworth et al.
8,301,743 B2 10/2012 Curran et al.
8,315,389 B2 11/2012 Qiu et al.
8,326,091 B1 12/2012 Jing et al.
8,326,315 B2 12/2012 Phillips et al.
8,328,130 B2 12/2012 Goossen
8,352,183 B2 1/2013 Thota et al.
8,364,757 B2 1/2013 Scott et al.
8,370,003 B2 2/2013 So et al.
8,380,382 B2 2/2013 Sung et al.
8,380,638 B1 2/2013 Watkins
8,391,789 B2 3/2013 Palin et al.
8,391,909 B2 3/2013 Stewart
8,401,771 B2 3/2013 Krumm et al.
8,402,094 B2 3/2013 Bosworth et al.
8,402,372 B2 3/2013 Gillespie et al.
8,412,576 B2 4/2013 Urbanski
8,412,675 B2 4/2013 Alvarado et al.
8,427,308 B1 4/2013 Baron, Sr. et al.
8,428,565 B2 4/2013 Middleton et al.
8,433,609 B2 4/2013 Abhyanker
8,433,650 B1 4/2013 Thomas
8,438,156 B2 5/2013 Redstone et al.
8,442,923 B2 5/2013 Gross
8,443,107 B2 5/2013 Burdette et al.
8,447,810 B2 5/2013 Roumeliotis et al.
8,463,295 B1 6/2013 Caralis et al.
8,463,764 B2 6/2013 Fujioka et al.
8,473,199 B2 6/2013 Blumberg et al.
8,493,849 B2 7/2013 Fuste Vilella et al.
8,504,284 B2 8/2013 Brülle-Drews et al.
8,504,512 B2 8/2013 Herzog et al.
8,510,268 B1 8/2013 Laforge et al.
8,521,656 B2 8/2013 Zimberoff et al.
8,538,458 B2 9/2013 Haney
8,543,143 B2 9/2013 Chandra et al.
8,543,323 B1 9/2013 Gold et al.
8,548,493 B2 10/2013 Rieger, III
8,554,770 B2 10/2013 Purdy
8,554,852 B2 10/2013 Burnim
8,560,515 B2 10/2013 Kimchi et al.
8,584,091 B2 11/2013 Champion et al.
8,589,330 B2 11/2013 Petersen et al.
8,594,715 B1 11/2013 Stewart
8,595,292 B2 11/2013 Grayson et al.
8,600,602 B1 12/2013 McAndrew et al.
8,615,565 B2 12/2013 Randall
8,620,532 B2 12/2013 Curtis et al.
8,620,827 B1 12/2013 Watkins, III
8,621,374 B2 12/2013 Sheha et al.
8,626,699 B2 1/2014 Xie et al.
8,627,506 B2 1/2014 Vera et al.
8,649,976 B2 2/2014 Kreft
8,650,103 B2 2/2014 Wilf et al.
8,655,873 B2 2/2014 Mitchell et al.
8,660,541 B1 2/2014 Beresniewicz et al.
8,660,897 B2 2/2014 Abhyanker
8,666,660 B2 3/2014 Sartipi et al.
8,671,095 B2 3/2014 Gross
8,671,106 B1 3/2014 Lee et al.
8,683,342 B2 3/2014 Van Riel
8,688,594 B2 4/2014 Thomas et al.
8,694,605 B1 4/2014 Burrell et al.
8,695,919 B2 4/2014 Shachor et al.
8,712,441 B2 4/2014 Haney
8,713,055 B2 4/2014 Callahan et al.
8,713,143 B2 4/2014 Centola et al.
8,718,910 B2 5/2014 GuÉZiec
8,723,679 B2 5/2014 Whisenant
8,732,091 B1 5/2014 Abhyanker
8,732,155 B2 5/2014 Vegnaduzzo et al.
8,732,219 B1 5/2014 Ferries et al.
8,732,846 B2 5/2014 D'Angelo et al.
8,738,545 B2 5/2014 Abhyanker
8,775,405 B2 7/2014 Gross
D710,454 S 8/2014 Barajas et al.
8,794,566 B2 8/2014 Hutson
8,799,253 B2 8/2014 Valliani et al.
8,825,226 B1 9/2014 Worley, III et al.
8,832,556 B2 9/2014 Steinberg
2001/0005829 A1 6/2001 Raveis
2001/0016795 A1 8/2001 Bellinger
2001/0020955 A1 9/2001 Nakagawa et al.
2001/0029426 A1 10/2001 Hancock et al.
2001/0029501 A1 10/2001 Yokobori et al.
2001/0036833 A1 11/2001 Koshima et al.
2001/0037721 A1 11/2001 Hasegawa et al.
2001/0042087 A1 11/2001 Kephart et al.
2001/0049616 A1 12/2001 Khuzadi et al.
2001/0049636 A1 12/2001 Hudda et al.
2002/0019739 A1 2/2002 Juneau et al.
2002/0023018 A1 2/2002 Kleinbaum
2002/0026388 A1 2/2002 Roebuck
2002/0029350 A1 3/2002 Cooper et al.
2002/0030689 A1 3/2002 Eichel et al.
2002/0038225 A1 3/2002 Klasky et al.
2002/0046131 A1 4/2002 Boone et al.
2002/0046243 A1 4/2002 Morris et al.
2002/0049617 A1 4/2002 Lencki et al.
2002/0059201 A1 5/2002 Work
2002/0059379 A1 5/2002 Harvey et al.
2002/0065691 A1 5/2002 Twig et al.
2002/0065739 A1 5/2002 Florance et al.
2002/0070967 A1 6/2002 Tanner et al.
2002/0072848 A1 6/2002 Hamada et al.
2002/0077060 A1 6/2002 Lehikoinen et al.
2002/0077901 A1 6/2002 Katz
2002/0078171 A1 6/2002 Schneider
2002/0087260 A1 7/2002 Hancock et al.
2002/0087506 A1 7/2002 Reddy
2002/0090996 A1 7/2002 Maehiro
2002/0091556 A1 7/2002 Fiala et al.
2002/0097267 A1 7/2002 Dinan et al.
2002/0099693 A1 7/2002 Kofsky
2002/0103813 A1 8/2002 Frigon
2002/0103892 A1 8/2002 Rieger
2002/0124009 A1 9/2002 Hoblit
2002/0124053 A1 9/2002 Adams et al.
2002/0130906 A1 9/2002 Miyaki
2002/0133292 A1 9/2002 Miyaki
2002/0143462 A1 10/2002 Warren
2002/0147638 A1 10/2002 Banerjee et al.
2002/0156782 A1 10/2002 Rubert
2002/0156917 A1 10/2002 Nye
2002/0160762 A1 10/2002 Nave et al.
2002/0161666 A1 10/2002 Fraki et al.
2002/0169662 A1 11/2002 Claiborne
2002/0184496 A1 12/2002 Mitchell et al.
2002/0188522 A1 12/2002 McCall et al.
2003/0004802 A1 1/2003 Callegari
2003/0005035 A1 1/2003 Rodgers
2003/0018521 A1 1/2003 Kraft et al.
2003/0023489 A1 1/2003 McGuire et al.
2003/0023586 A1 1/2003 Knorr
2003/0033176 A1 2/2003 Hancock
2003/0036958 A1 2/2003 Warmus et al.
2003/0036963 A1 2/2003 Jacobson et al.
2003/0055983 A1 3/2003 Callegari
2003/0061503 A1 3/2003 Katz et al.
2003/0063072 A1 4/2003 Brandenberg et al.
2003/0064705 A1 4/2003 Desiderio
2003/0065716 A1 4/2003 Kyusojin
2003/0069002 A1 4/2003 Hunter et al.
2003/0069693 A1 4/2003 Snapp et al.
2003/0078897 A1 4/2003 Florance et al.

(56) References Cited

U.S. PATENT DOCUMENTS

2003/0088520 A1 5/2003 Bohrer et al.
2003/0145093 A1 7/2003 Oren et al.
2003/0154020 A1 8/2003 Polidi
2003/0154213 A1 8/2003 Ahn
2003/0158668 A1 8/2003 Anderson
2003/0177019 A1 9/2003 Santos et al.
2003/0177192 A1 9/2003 Umeki et al.
2003/0182222 A1 9/2003 Rotman et al.
2003/0200192 A1 10/2003 Bell et al.
2003/0218253 A1 11/2003 Avanzino et al.
2003/0220807 A1 11/2003 Hoffman et al.
2003/0222918 A1 12/2003 Coulthard
2003/0225632 A1 12/2003 Tong et al.
2003/0225833 A1 12/2003 Pilat et al.
2004/0002871 A1 1/2004 Geranio
2004/0003283 A1 1/2004 Goodman et al.
2004/0021584 A1 2/2004 Hartz et al.
2004/0024846 A1 2/2004 Randall et al.
2004/0030525 A1 2/2004 Robinson et al.
2004/0030741 A1 2/2004 Wolton et al.
2004/0039581 A1 2/2004 Wheeler
2004/0054428 A1 3/2004 Sheha et al.
2004/0056762 A1 3/2004 Rogers
2004/0088177 A1 5/2004 Travis et al.
2004/0109012 A1 6/2004 Kraus et al.
2004/0111302 A1 6/2004 Falk et al.
2004/0122570 A1 6/2004 Sonoyama et al.
2004/0122693 A1 6/2004 Hatscher et al.
2004/0128215 A1 7/2004 Florance et al.
2004/0135805 A1 7/2004 Gottsacker et al.
2004/0139034 A1 7/2004 Farmer
2004/0139049 A1 7/2004 Hancock et al.
2004/0145593 A1 7/2004 Berkner et al.
2004/0146199 A1 7/2004 Berkner et al.
2004/0148275 A1 7/2004 Achlioptas
2004/0153466 A1 8/2004 Ziff et al.
2004/0157648 A1 8/2004 Lightman
2004/0158488 A1 8/2004 Johnson
2004/0162064 A1 8/2004 Himmelstein
2004/0166878 A1 8/2004 Erskine et al.
2004/0167787 A1 8/2004 Lynch et al.
2004/0172280 A1 9/2004 Fraki et al.
2004/0186766 A1 9/2004 Fellenstein et al.
2004/0210661 A1 10/2004 Thompson
2004/0215517 A1 10/2004 Chen et al.
2004/0215559 A1 10/2004 Rebenack et al.
2004/0217884 A1 11/2004 Samadani et al.
2004/0217980 A1 11/2004 Radburn et al.
2004/0220903 A1 11/2004 Shah et al.
2004/0220906 A1 11/2004 Gargi et al.
2004/0230562 A1 11/2004 Wysoczanski et al.
2004/0236771 A1 11/2004 Colver et al.
2004/0243478 A1 12/2004 Walker et al.
2004/0257340 A1 12/2004 Jawerth
2004/0260604 A1 12/2004 Bedingfield
2004/0260677 A1 12/2004 Malpani et al.
2004/0267625 A1 12/2004 Feng et al.
2005/0015488 A1 1/2005 Bayyapu
2005/0018177 A1 1/2005 Rosenberg et al.
2005/0021750 A1 1/2005 Abrams
2005/0027723 A1 2/2005 Jones et al.
2005/0034075 A1 2/2005 Riegelman et al.
2005/0044061 A1 2/2005 Klemow
2005/0049971 A1 3/2005 Bettinger
2005/0055353 A1 3/2005 Marx et al.
2005/0086309 A1 4/2005 Galli et al.
2005/0091027 A1 4/2005 Zaher et al.
2005/0091175 A9 4/2005 Farmer
2005/0091209 A1 4/2005 Frank et al.
2005/0094851 A1 5/2005 Bodin et al.
2005/0096977 A1 5/2005 Rossides
2005/0097319 A1 5/2005 Zhu et al.
2005/0108520 A1 5/2005 Yamamoto et al.
2005/0114527 A1 5/2005 Hankey et al.
2005/0114759 A1 5/2005 Williams et al.
2005/0114783 A1 5/2005 Szeto
2005/0120084 A1 6/2005 Hu et al.
2005/0131761 A1 6/2005 Trika et al.
2005/0137015 A1 6/2005 Rogers et al.
2005/0143174 A1 6/2005 Goldman et al.
2005/0144065 A1 6/2005 Calabria et al.
2005/0149432 A1 7/2005 Galey
2005/0154639 A1 7/2005 Zetmeir
2005/0159970 A1 7/2005 Buyukkokten et al.
2005/0171799 A1 8/2005 Hull et al.
2005/0171832 A1 8/2005 Hull et al.
2005/0171954 A1 8/2005 Hull et al.
2005/0171955 A1 8/2005 Hull et al.
2005/0177385 A1 8/2005 Hull et al.
2005/0187823 A1 8/2005 Howes
2005/0192859 A1 9/2005 Mertins et al.
2005/0192912 A1 9/2005 Bator et al.
2005/0192999 A1 9/2005 Cook et al.
2005/0193410 A1 9/2005 Eldering
2005/0197775 A1 9/2005 Smith
2005/0197846 A1 9/2005 Pezaris et al.
2005/0197950 A1 9/2005 Moya et al.
2005/0198020 A1 9/2005 Garland et al.
2005/0198031 A1 9/2005 Pezaris et al.
2005/0198305 A1 9/2005 Pezaris et al.
2005/0203768 A1 9/2005 Florance et al.
2005/0203769 A1 9/2005 Weild
2005/0203807 A1 9/2005 Bezos et al.
2005/0209776 A1 9/2005 Ogino et al.
2005/0209781 A1 9/2005 Anderson
2005/0216186 A1 9/2005 Dorfman et al.
2005/0216300 A1 9/2005 Appelman et al.
2005/0216550 A1 9/2005 Paseman et al.
2005/0219044 A1 10/2005 Douglass et al.
2005/0235062 A1 10/2005 Lunt et al.
2005/0240580 A1 10/2005 Zamir et al.
2005/0251331 A1 11/2005 Kreft
2005/0256756 A1 11/2005 Lam et al.
2005/0259648 A1 11/2005 Kodialam et al.
2005/0270299 A1 12/2005 Rasmussen et al.
2005/0273346 A1 12/2005 Frost
2005/0283497 A1 12/2005 Nurminen et al.
2005/0288957 A1 12/2005 Eraker et al.
2005/0288958 A1 12/2005 Eraker et al.
2005/0289650 A1 12/2005 Kalogridis
2006/0004680 A1 1/2006 Robarts et al.
2006/0004703 A1 1/2006 Spivack et al.
2006/0004734 A1 1/2006 Malkin et al.
2006/0022048 A1 2/2006 Johnson
2006/0023881 A1 2/2006 Akiyama et al.
2006/0025883 A1 2/2006 Reeves
2006/0026147 A1 2/2006 Cone et al.
2006/0036588 A1 2/2006 Frank et al.
2006/0036748 A1 2/2006 Nusbaum et al.
2006/0041543 A1 2/2006 Achlioptas
2006/0042483 A1 3/2006 Work et al.
2006/0047825 A1 3/2006 Steenstra et al.
2006/0048059 A1 3/2006 Etkin
2006/0052091 A1 3/2006 Onyon et al.
2006/0058921 A1 3/2006 Okamoto
2006/0058952 A1 3/2006 Cooper et al.
2006/0059023 A1 3/2006 Mashinsky
2006/0064431 A1 3/2006 Kishore et al.
2006/0074780 A1 4/2006 Taylor et al.
2006/0075335 A1 4/2006 Gloor
2006/0080613 A1 4/2006 Savant
2006/0085419 A1 4/2006 Rosen
2006/0088145 A1 4/2006 Reed et al.
2006/0089882 A1 4/2006 Shimansky
2006/0100892 A1 5/2006 Ellanti
2006/0113425 A1 6/2006 Rader
2006/0123053 A1 6/2006 Scannell
2006/0125616 A1 6/2006 Song
2006/0136127 A1 6/2006 Coch et al.
2006/0136419 A1 6/2006 Brydon et al.
2006/0143066 A1 6/2006 Calabria
2006/0143067 A1 6/2006 Calabria
2006/0143083 A1 6/2006 Wedeen
2006/0143183 A1 6/2006 Goldberg et al.

(56) References Cited

U.S. PATENT DOCUMENTS

2006/0149624 A1 7/2006 Baluja et al.
2006/0161599 A1 7/2006 Rosen
2006/0178972 A1 8/2006 Jung et al.
2006/0184578 A1 8/2006 La Rotonda et al.
2006/0184617 A1 8/2006 Nicholas et al.
2006/0184997 A1 8/2006 La Rotonda et al.
2006/0190279 A1 8/2006 Heflin
2006/0190281 A1 8/2006 Kott et al.
2006/0194186 A1 8/2006 Nanda
2006/0200384 A1 9/2006 Arutunian et al.
2006/0212407 A1 9/2006 Lyon
2006/0217885 A1 9/2006 Crady et al.
2006/0218225 A1 9/2006 Hee Voon et al.
2006/0218226 A1 9/2006 Johnson et al.
2006/0223518 A1 10/2006 Haney
2006/0226281 A1 10/2006 Walton
2006/0229063 A1 10/2006 Koch
2006/0230061 A1 10/2006 Sample et al.
2006/0238383 A1 10/2006 Kimchi et al.
2006/0242139 A1 10/2006 Butterfield et al.
2006/0242178 A1 10/2006 Butterfield et al.
2006/0242581 A1 10/2006 Manion et al.
2006/0247940 A1 11/2006 Zhu et al.
2006/0248573 A1 11/2006 Pannu et al.
2006/0251292 A1 11/2006 Gokturk et al.
2006/0253491 A1 11/2006 Gokturk et al.
2006/0256008 A1 11/2006 Rosenberg
2006/0264209 A1 11/2006 Atkinson et al.
2006/0265277 A1 11/2006 Yasinovsky et al.
2006/0265417 A1 11/2006 Amato et al.
2006/0270419 A1 11/2006 Crowley et al.
2006/0270421 A1 11/2006 Phillips et al.
2006/0271287 A1 11/2006 Gold et al.
2006/0271472 A1 11/2006 Cagan
2006/0293976 A1 12/2006 Nam
2006/0294011 A1 12/2006 Smith
2007/0002057 A1 1/2007 Danzig et al.
2007/0003182 A1 1/2007 Hunn
2007/0005683 A1 1/2007 Omidyar
2007/0005750 A1 1/2007 Lunt et al.
2007/0011148 A1 1/2007 Burkey et al.
2007/0011617 A1 1/2007 Akagawa et al.
2007/0016689 A1 1/2007 Birch
2007/0027920 A1 2/2007 Alvarado et al.
2007/0032942 A1 2/2007 Thota
2007/0033064 A1 2/2007 Abrahamsohn
2007/0033182 A1 2/2007 Knorr
2007/0038646 A1 2/2007 Thota
2007/0043947 A1 2/2007 Mizikovsky et al.
2007/0050360 A1 3/2007 Hull et al.
2007/0061128 A1 3/2007 Odom et al.
2007/0061405 A1 3/2007 Keohane et al.
2007/0067219 A1 3/2007 Altberg et al.
2007/0078747 A1 4/2007 Baack
2007/0078772 A1 4/2007 Dadd
2007/0099609 A1 5/2007 Cai
2007/0105536 A1 5/2007 Tingo
2007/0106627 A1 5/2007 Srivastava et al.
2007/0112461 A1 5/2007 Zini et al.
2007/0112645 A1 5/2007 Traynor et al.
2007/0112729 A1 5/2007 Wiseman et al.
2007/0118430 A1 5/2007 Wiseman et al.
2007/0118525 A1 5/2007 Svendsen
2007/0150375 A1 6/2007 Yang
2007/0150603 A1 6/2007 Crull et al.
2007/0156429 A1 7/2007 Godar
2007/0159651 A1 7/2007 Disario et al.
2007/0162432 A1 7/2007 Armstrong et al.
2007/0162458 A1 7/2007 Fasciano
2007/0162547 A1 7/2007 Ross
2007/0162942 A1 7/2007 Hamynen et al.
2007/0167204 A1 7/2007 Lyle et al.
2007/0168852 A1 7/2007 Erol et al.
2007/0168888 A1 7/2007 Jawerth
2007/0174389 A1 7/2007 Armstrong et al.
2007/0179905 A1 8/2007 Buch et al.
2007/0185906 A1 8/2007 Humphries et al.
2007/0192299 A1 8/2007 Zuckerberg et al.
2007/0203644 A1 8/2007 Thota et al.
2007/0203820 A1 8/2007 Rashid
2007/0207755 A1 9/2007 Julia et al.
2007/0208613 A1 9/2007 Backer
2007/0208802 A1 9/2007 Barman et al.
2007/0208916 A1 9/2007 Tomita
2007/0214141 A1 9/2007 Sittig et al.
2007/0218900 A1 9/2007 Abhyanker
2007/0219659 A1 9/2007 Abhyanker et al.
2007/0219712 A1 9/2007 Abhyanker
2007/0220174 A1 9/2007 Abhyanker
2007/0226314 A1 9/2007 Eick et al.
2007/0233291 A1 10/2007 Herde et al.
2007/0233367 A1 10/2007 Chen et al.
2007/0233375 A1 10/2007 Garg et al.
2007/0233582 A1 10/2007 Abhyanker
2007/0239352 A1 10/2007 Thota et al.
2007/0239552 A1 10/2007 Sundaresan
2007/0239648 A1 10/2007 Thota
2007/0245002 A1 10/2007 Nguyen et al.
2007/0250321 A1 10/2007 Balusu
2007/0250511 A1 10/2007 Endler et al.
2007/0255785 A1 11/2007 Hayashi et al.
2007/0255831 A1 11/2007 Hayashi et al.
2007/0258642 A1 11/2007 Thota
2007/0259654 A1 11/2007 Oijer
2007/0260599 A1 11/2007 McGuire et al.
2007/0261071 A1 11/2007 Lunt et al.
2007/0266003 A1 11/2007 Wong et al.
2007/0266097 A1 11/2007 Harik et al.
2007/0266118 A1 11/2007 Wilkins
2007/0268310 A1 11/2007 Dolph et al.
2007/0270163 A1 11/2007 Anupam et al.
2007/0271367 A1 11/2007 Yardeni et al.
2007/0273558 A1 11/2007 Smith et al.
2007/0281689 A1 12/2007 Altman et al.
2007/0281690 A1 12/2007 Altman et al.
2007/0281716 A1 12/2007 Altman et al.
2007/0282621 A1 12/2007 Altman et al.
2007/0282987 A1 12/2007 Fischer et al.
2007/0288164 A1 12/2007 Gordon et al.
2007/0288311 A1 12/2007 Underhill
2007/0288621 A1 12/2007 Gundu et al.
2007/0294357 A1 12/2007 Antoine
2008/0005076 A1 1/2008 Payne et al.
2008/0005231 A1 1/2008 Kelley et al.
2008/0010343 A1 1/2008 Escaffi et al.
2008/0010365 A1 1/2008 Schneider
2008/0016051 A1 1/2008 Schiller
2008/0020814 A1 1/2008 Kernene
2008/0032666 A1 2/2008 Hughes et al.
2008/0032703 A1 2/2008 Krumm et al.
2008/0033641 A1 2/2008 Medalia
2008/0033652 A1 2/2008 Hensley et al.
2008/0033739 A1 2/2008 Zuckerberg et al.
2008/0033776 A1 2/2008 Marchese
2008/0040370 A1 2/2008 Bosworth et al.
2008/0040428 A1 2/2008 Wei et al.
2008/0040474 A1 2/2008 Zuckerberg et al.
2008/0040475 A1 2/2008 Bosworth et al.
2008/0040673 A1 2/2008 Zuckerberg et al.
2008/0043020 A1 2/2008 Snow et al.
2008/0043037 A1 2/2008 Carroll
2008/0046976 A1 2/2008 Zuckerberg
2008/0048065 A1 2/2008 Kuntz
2008/0051932 A1 2/2008 Jermyn et al.
2008/0059992 A1 3/2008 Amidon et al.
2008/0065321 A1 3/2008 DaCosta
2008/0065611 A1 3/2008 Hepworth et al.
2008/0070593 A1 3/2008 Altman et al.
2008/0070697 A1 3/2008 Robinson et al.
2008/0071929 A1 3/2008 Motte et al.
2008/0077464 A1 3/2008 Gottlieb et al.
2008/0077581 A1 3/2008 Drayer et al.
2008/0077642 A1 3/2008 Carbone et al.
2008/0077708 A1 3/2008 Scott et al.

(56) References Cited

U.S. PATENT DOCUMENTS

2008/0086368 A1 4/2008 Bauman et al.
2008/0086458 A1 4/2008 Robinson et al.
2008/0091461 A1 4/2008 Evans et al.
2008/0091723 A1 4/2008 Zuckerberg et al.
2008/0091786 A1 4/2008 Jhanji
2008/0097999 A1 4/2008 Horan
2008/0098090 A1 4/2008 Geraci et al.
2008/0098313 A1 4/2008 Pollack
2008/0103959 A1 5/2008 Carroll et al.
2008/0104227 A1 5/2008 Birnie et al.
2008/0109718 A1 5/2008 Narayanaswami
2008/0115082 A1 5/2008 Simmons et al.
2008/0115226 A1 5/2008 Welingkar et al.
2008/0117928 A1 5/2008 Abhyanker
2008/0125969 A1 5/2008 Chen et al.
2008/0126355 A1 5/2008 Rowley
2008/0126411 A1 5/2008 Zhuang et al.
2008/0126476 A1 5/2008 Nicholas et al.
2008/0126478 A1 5/2008 Ferguson et al.
2008/0133495 A1 6/2008 Fischer
2008/0133649 A1 6/2008 Pennington
2008/0134035 A1 6/2008 Pennington et al.
2008/0148156 A1 6/2008 Brewer et al.
2008/0154733 A1 6/2008 Wolfe
2008/0155019 A1 6/2008 Wallace et al.
2008/0162027 A1 7/2008 Murphy et al.
2008/0162211 A1 7/2008 Addington
2008/0162260 A1 7/2008 Rohan et al.
2008/0167771 A1 7/2008 Whittaker et al.
2008/0168068 A1 7/2008 Hutheesing
2008/0168175 A1 7/2008 Tran
2008/0172173 A1 7/2008 Chang et al.
2008/0172244 A1 7/2008 Coupal et al.
2008/0172288 A1 7/2008 Pilskalns et al.
2008/0189292 A1 8/2008 Stremel et al.
2008/0189380 A1 8/2008 Bosworth et al.
2008/0189768 A1 8/2008 Callahan et al.
2008/0195483 A1 8/2008 Moore
2008/0201156 A1 8/2008 Abhyanker
2008/0208956 A1 8/2008 Spiridellis et al.
2008/0208969 A1 8/2008 Van Riel
2008/0215994 A1 9/2008 Harrison et al.
2008/0221846 A1 9/2008 Aggarwal et al.
2008/0221984 A1 9/2008 Abhyanker
2008/0222140 A1 9/2008 Lagad et al.
2008/0222308 A1 9/2008 Abhyanker
2008/0228719 A1 9/2008 Abhyanker et al.
2008/0228775 A1 9/2008 Abhyanker et al.
2008/0229424 A1 9/2008 Harris et al.
2008/0231630 A1 9/2008 Shenkar et al.
2008/0238941 A1 10/2008 Kinnan et al.
2008/0240397 A1 10/2008 Abhyanker
2008/0242317 A1 10/2008 Abhyanker
2008/0243378 A1 10/2008 Zavoli
2008/0243598 A1 10/2008 Abhyanker
2008/0243667 A1 10/2008 Lecomte
2008/0243830 A1 10/2008 Abhyanker
2008/0250025 A1 10/2008 Abhyanker
2008/0255759 A1 10/2008 Abhyanker
2008/0256230 A1 10/2008 Handley
2008/0263460 A1 10/2008 Altberg et al.
2008/0269992 A1 10/2008 Kawasaki
2008/0270158 A1 10/2008 Abhyanker
2008/0270366 A1 10/2008 Frank
2008/0270615 A1 10/2008 Centola et al.
2008/0270945 A1 10/2008 Abhyanker
2008/0281854 A1 11/2008 Abhyanker
2008/0288277 A1 11/2008 Fasciano
2008/0288612 A1 11/2008 Kwon
2008/0294678 A1 11/2008 Gorman et al.
2008/0294747 A1 11/2008 Abhyanker
2008/0300979 A1 12/2008 Abhyanker
2008/0301565 A1 12/2008 Abhyanker
2008/0306754 A1 12/2008 Abhyanker
2008/0307053 A1 12/2008 Mitnick et al.
2008/0307066 A1 12/2008 Amidon et al.
2008/0307320 A1 12/2008 Payne et al.
2008/0316021 A1 12/2008 Manz et al.
2008/0319778 A1 12/2008 Abhyanker
2008/0319806 A1 12/2008 Abhyanker
2009/0003265 A1 1/2009 Agarwal et al.
2009/0006177 A1 1/2009 Beaver et al.
2009/0006473 A1 1/2009 Elliott et al.
2009/0007195 A1 1/2009 Beyabani
2009/0018850 A1 1/2009 Abhyanker
2009/0018925 A1 1/2009 Abhyanker
2009/0019004 A1 1/2009 Abhyanker
2009/0019085 A1 1/2009 Abhyanker
2009/0019122 A1 1/2009 Abhyanker
2009/0019366 A1 1/2009 Abhyanker
2009/0019373 A1 1/2009 Abhyanker
2009/0024740 A1 1/2009 Abhyanker
2009/0029672 A1 1/2009 Manz
2009/0030927 A1 1/2009 Cases et al.
2009/0031006 A1 1/2009 Johnson
2009/0031245 A1 1/2009 Brezina et al.
2009/0031301 A1 1/2009 D'Angelo et al.
2009/0043650 A1 2/2009 Abhyanker et al.
2009/0044254 A1 2/2009 Tian
2009/0048922 A1 2/2009 Morgenstern et al.
2009/0049018 A1 2/2009 Gross
2009/0049037 A1 2/2009 Gross
2009/0049070 A1 2/2009 Steinberg
2009/0049127 A1 2/2009 Juan et al.
2009/0061883 A1 3/2009 Abhyanker
2009/0063252 A1 3/2009 Abhyanker
2009/0063467 A1 3/2009 Abhyanker
2009/0063500 A1 3/2009 Zhai et al.
2009/0064011 A1 3/2009 Abhyanker
2009/0064144 A1 3/2009 Abhyanker
2009/0069034 A1 3/2009 Abhyanker
2009/0070334 A1 3/2009 Callahan et al.
2009/0070435 A1 3/2009 Abhyanker
2009/0077100 A1 3/2009 Hancock et al.
2009/0102644 A1 4/2009 Hayden
2009/0119275 A1 5/2009 Chen et al.
2009/0132504 A1 5/2009 Vegnaduzzo et al.
2009/0132644 A1 5/2009 Frishert et al.
2009/0171950 A1 7/2009 Lunenfeld
2009/0177577 A1 7/2009 Garcia
2009/0177628 A1 7/2009 Yanagisawa et al.
2009/0228305 A1 9/2009 Gustafsson et al.
2009/0254971 A1 10/2009 Herz et al.
2009/0271417 A1 10/2009 Toebes et al.
2009/0271524 A1 10/2009 Davi et al.
2009/0282353 A1 11/2009 Halbherr et al.
2009/0284530 A1 11/2009 Lester et al.
2009/0287682 A1 11/2009 Fujioka et al.
2009/0299551 A1 12/2009 So et al.
2010/0011081 A1 1/2010 Crowley et al.
2010/0023388 A1 1/2010 Blumberg et al.
2010/0024045 A1 1/2010 Sastry et al.
2010/0051740 A1 3/2010 Yoeli
2010/0057555 A1 3/2010 Butterfield et al.
2010/0064007 A1 3/2010 Randall
2010/0070075 A1 3/2010 Chirnomas
2010/0076966 A1 3/2010 Strutton et al.
2010/0077316 A1 3/2010 Omansky et al.
2010/0079338 A1 4/2010 Wooden et al.
2010/0082683 A1 4/2010 Law et al.
2010/0083125 A1 4/2010 Zafar et al.
2010/0088015 A1 4/2010 Lee
2010/0094548 A1 4/2010 Tadman et al.
2010/0100937 A1 4/2010 Tran
2010/0106731 A1 4/2010 Cartmell et al.
2010/0108801 A1 5/2010 Olm et al.
2010/0118025 A1 5/2010 Smith et al.
2010/0120422 A1 5/2010 Cheung et al.
2010/0138259 A1 6/2010 Delk
2010/0138318 A1 6/2010 Chun
2010/0191798 A1 7/2010 Seefeld et al.
2010/0198684 A1 8/2010 Eraker et al.
2010/0214250 A1 8/2010 Gillespie et al.
2010/0231383 A1 9/2010 Levine et al.

(56) References Cited

U.S. PATENT DOCUMENTS

2010/0243794 A1 9/2010 Jermyn
2010/0255899 A1 10/2010 Paulsen
2010/0275033 A1 10/2010 Gillespie et al.
2010/0306016 A1 12/2010 Solaro et al.
2011/0001020 A1 1/2011 Forgac
2011/0015954 A1 1/2011 Ward
2011/0022540 A1 1/2011 Stern et al.
2011/0040681 A1 2/2011 Ahroon
2011/0040692 A1 2/2011 Ahroon
2011/0041084 A1 2/2011 Karam
2011/0061018 A1 3/2011 Piratla et al.
2011/0066588 A1 3/2011 Xie et al.
2011/0066648 A1 3/2011 Abhyanker et al.
2011/0078012 A1 3/2011 Adamec
2011/0078270 A1 3/2011 Galli et al.
2011/0082747 A1 4/2011 Khan et al.
2011/0087667 A1 4/2011 Hutheesing
2011/0093340 A1 4/2011 Kramer et al.
2011/0093498 A1 4/2011 Lunt et al.
2011/0099142 A1 4/2011 Karjalainen et al.
2011/0106658 A1 5/2011 Britt
2011/0112976 A1 5/2011 Ryan et al.
2011/0118907 A1* 5/2011 Elkins ...................... B64B 1/00 701/3
2011/0128144 A1 6/2011 Baron, Sr. et al.
2011/0131172 A1 6/2011 Herzog et al.
2011/0151898 A1 6/2011 Chandra et al.
2011/0163160 A1 7/2011 Zini et al.
2011/0174920 A1 7/2011 Yoeli
2011/0181470 A1 7/2011 Qiu et al.
2011/0184643 A1 7/2011 Abhyanker
2011/0202426 A1 8/2011 Cretney et al.
2011/0219318 A1 9/2011 Abhyanker
2011/0231268 A1 9/2011 Ungos
2011/0246258 A1 10/2011 Cragun et al.
2011/0256895 A1 10/2011 Palin et al.
2011/0258028 A1 10/2011 Satyavolu et al.
2011/0264692 A1 10/2011 Kardell
2011/0291851 A1 12/2011 Whisenant
2012/0023196 A1 1/2012 Grayson et al.
2012/0047102 A1 2/2012 Petersen et al.
2012/0047448 A1 2/2012 Amidon et al.
2012/0077523 A1 3/2012 Roumeliotis et al.
2012/0084289 A1 4/2012 Hutheesing
2012/0096098 A1 4/2012 Balassanian
2012/0123667 A1 5/2012 Guéziec
2012/0126974 A1 5/2012 Phillips et al.
2012/0138732 A1 6/2012 Olm et al.
2012/0163206 A1 6/2012 Leung et al.
2012/0166935 A1 6/2012 Abhyanker
2012/0191606 A1 7/2012 Milne
2012/0191797 A1 7/2012 Masonis et al.
2012/0209775 A1 8/2012 Milne
2012/0221470 A1 8/2012 Lyon
2012/0224076 A1 9/2012 Niedermeyer et al.
2012/0232958 A1 9/2012 Silbert
2012/0239483 A1 9/2012 Yankovich et al.
2012/0239520 A1 9/2012 Lee
2012/0246024 A1 9/2012 Thomas et al.
2012/0254774 A1 10/2012 Patton
2012/0259688 A1 10/2012 Kim
2012/0264447 A1 10/2012 Rieger, III
2012/0270567 A1 10/2012 Johnson
2012/0278743 A1 11/2012 Heckman et al.
2012/0331002 A1 12/2012 Carrington
2013/0005307 A1 1/2013 Kim et al.
2013/0024108 A1 1/2013 Grün
2013/0041761 A1 2/2013 Voda
2013/0041862 A1 2/2013 Yang et al.
2013/0054317 A1 2/2013 Abhyanker
2013/0055163 A1 2/2013 Matas et al.
2013/0068876 A1 3/2013 Radu
2013/0072114 A1 3/2013 Abhyanker
2013/0073375 A1 3/2013 Abhyanker
2013/0073474 A1 3/2013 Young et al.
2013/0080217 A1 3/2013 Abhyanker
2013/0103437 A1 4/2013 Nelson
2013/0105635 A1 5/2013 Alzu'bi et al.
2013/0110631 A1 5/2013 Mitchell et al.
2013/0151455 A1 6/2013 Odom et al.
2013/0159127 A1 6/2013 Myslinski
2013/0204437 A1 8/2013 Koselka et al.
2013/0238170 A1* 9/2013 Klinger .................. G05D 1/104 701/3
2013/0254670 A1 9/2013 Eraker et al.
2013/0282842 A1 10/2013 Blecon et al.
2013/0297589 A1 11/2013 Work et al.
2013/0301405 A1 11/2013 Fuste Vilella et al.
2013/0303197 A1 11/2013 Chandra et al.
2013/0317999 A1 11/2013 Zimberoff et al.
2014/0032034 A1 1/2014 Raptopoulos et al.
2014/0040179 A1 1/2014 Shai Herzog et al.
2014/0067167 A1 3/2014 Levien et al.
2014/0067704 A1 3/2014 Abhyanker
2014/0074736 A1 3/2014 Carrington
2014/0081450 A1 3/2014 Kuehnrich et al.
2014/0087780 A1 3/2014 Abhyanker et al.
2014/0095293 A1 4/2014 Abhyanker
2014/0100900 A1 4/2014 Abhyanker
2014/0108540 A1 4/2014 Crawford
2014/0108556 A1 4/2014 Abhyanker
2014/0108613 A1 4/2014 Randall
2014/0114866 A1 4/2014 Abhyanker
2014/0115671 A1 4/2014 Abhyanker
2014/0123246 A1 5/2014 Abhyanker
2014/0123247 A1 5/2014 Abhyanker
2014/0130140 A1 5/2014 Abhyanker
2014/0135039 A1 5/2014 Sartipi et al.
2014/0136328 A1 5/2014 Abhyanker
2014/0136414 A1 5/2014 Abhyanker
2014/0136624 A1 5/2014 Abhyanker
2014/0142848 A1 5/2014 Chen et al.
2014/0143061 A1 5/2014 Abhyanker
2014/0149244 A1 5/2014 Abhyanker
2014/0149508 A1 5/2014 Middleton et al.
2014/0164126 A1 6/2014 Nicholas et al.
2014/0165091 A1 6/2014 Abhyanker
2014/0172727 A1 6/2014 Abhyanker et al.
2014/0204360 A1 7/2014 Dowski, Jr. et al.
2014/0222908 A1 8/2014 Park et al.
2014/0254896 A1 9/2014 Zhou et al.
2014/0277834 A1 9/2014 Levien et al.
2014/0316243 A1 10/2014 Niedermeyer

FOREIGN PATENT DOCUMENTS

WO 0054170 A2 9/2000
WO 01063423 A1 8/2001
WO 0201455 A2 1/2002
WO 0219236 A1 3/2002
WO 0241115 A2 5/2002
WO 03058540 A1 7/2003
WO 2005103624 A2 11/2005
WO 2006020471 A1 2/2006
WO 2007108927 A2 9/2007
WO 2007108928 A2 9/2007
WO 2007113844 A1 10/2007
WO 2008103149 A1 8/2008
WO 2008105766 A1 9/2008
WO 2008108772 A1 9/2008
WO 2008118119 A1 10/2008
WO 2008123851 A1 10/2008
WO 2008111929 A3 11/2008
WO 2009138559 A1 11/2009
WO 2010103163 A1 9/2010
WO 2013188762 A1 12/2013
WO 2014121145 A1 8/2014

OTHER PUBLICATIONS

Fatdoor Founder Sues Benchmark Capital, Saying It Stole His Idea for Nextdoor, All Things Digital Article, Nov. 11, 2011, by Liz Gannes (7 Pages) http://allthingsd.com/20111111/fatdoor-founder-sues-benchmark-capital-saying-it-sole-his-idea-for-nextdoor/.

(56) References Cited

OTHER PUBLICATIONS

Fatdoor CEO Talks About Balancing Security with Community, Wired Magazine, May 31, 2007, by Terrence Russell (2 Pages) http://www.wired.com/2007/05/fatdoor_ceo_tal/.
Fatdoor Launches Social Network for Your Neighborhood, Mashable Article, May 28, 2007, by Kristen Nicole (3 Pages) http://mashable.com/2007/05/28/fatdoor/.
Screenshots of Nextdoor website and its features—as submitted in Case5:14-cv-02335-BLF on Jul. 15, 2014 (pp. 19) http://www.nextdoor.com/.
Fatdoor turns neighborhoods into online social networks, VentureBeat News Article, May 28, 2007, by Dan Kaplan (pp. 4) http://venturebeat.com/2007/05/28/fatdoor-turns-neighborhoods-into-online-social-networks/.
Halloween Just Got Easier: Nextdoor Debuts Halloween Treat Map, Nextdoor Blog, Oct. 17, 2013, by Anne Dreshfield (pp. 6) http://blog.nextdoor.com/2013/10/17/halloween-just-got-easier-nextdoor-debuts-halloween-treat-map/.
Helping Neighbors Connect, Screenshot from FrontPorchForum website—screenshots of Aug. 21, 2014 (3 Pages) http://frontporchforum.com/.
Advocacy Strategy for the Age of Connectivity, Netcentric Advocacy: fatdoor.com (alpha), Jun. 23, 2007 (p. 1) http://www.network-centricadvocacy.net/2007/06/fatdoorcom-alph.html.
Silicon Valley venture capital and legal globalization Blog, WayBack Machine Blogs Apr. 8, 2008, by Raj V. Abhyanker (pp. 2) https://web.archive.org/web/20080706001509/http:/abhyanker.blogspot.com/.
Frontporchforum. screenshots. Jul. 19, 2006 webarchive.org 1-15 (herein FrontPorch) (pp. 15).
Fatdoor where 2.0 Launch Coverage Report, Jun. 21, 2007, by Sterling Communications (pp. 24).
Screenshot of Fatdoor on Wikipedia, Apr. 12, 2007 (p. 1).
Case No. 5-14-cv-02335-BLF *Complaint Fatdoor* v. *Nextdoor, Northern District of California*, with Exhibits A, B and C {Part 1 (pp. 258)} and Exhibits D, E, F, G and H {Part 2 (pp. 222)}, Jul. 15, 2014.
Expert Report—*Forensics of Jon Berryhill, Report, Nextdoor* v. *Abhyanker*, Aug. 8, 2014, by Berryhill Computer forensics Inc. (pp. 23).
Case No. 3:12-cv-05667-EMC *Complaint Nextdoor* v. *Abhyanker, Northern District of California*, Nov. 5, 2012 (pp. 46).
Expert Report—*Patent of Jeffrey G. Sheldon, Nextdoor* v. *Abhyanker*, Aug. 8, 2014 (pp. 7).
Exhibits of Expert Report—*Patent of Jeffrey G. Sheldon, Nextdoor* v. *Abhyanker*, with Attachments A, B, C, D and E (1/2) {Part 1 (pp. 46)} and Attachments E (2/2) and F {Part 2 (pp. 41)}.
Case No. 111-CV-212924 *Abhyanker* v. *Benchmark Capital Partners L.P.*, Superior Court of California, County of Santa Clara, Nov. 10, 2011 (pp. 78) http://www.scribd.com/doc/72441873/Stamped-COMPLAINT-Abhyanker-v-Benchmark-Capital-Et-Al-FILED-PUBLIC.
Neighbors Stop Diaper and Formula Thief in his Tracks, Nextdoor Blog, Aug. 15, 2014, by Anne Dreshfield (pp. 12) http://blog.nextdoor.com/.
Screenshot of Fatdoor website with its features—Aug. 21, 2014 (pp. 6) http://www.fatdoor.com/.
Screenshot of AirBnB website with its features—Aug. 21, 2014 (pp. 4) http://www.airbnb.com/.
Wikipedia entry AirBnB website—Aug. 21, 2014 (pp. 16) http://en.wikipedia.org/wiki/Airbnb.
AirBed&Breakfast for Connecting '07—Oct. 10, 2007 (1 Page) http://www.core77.com/blog/events/airbed_breakfast_for_connecting_07_7715.asp.
Case No. 5:14-cv-03844-PSG, *Complaint Fatdoor, Inc.* v. *IP Analytics LLC and Google Inc.*,Northern District of California, Aug. 25, 2014, (pp. 16).
Screenshot of Meetey on Crunch Base, Aug. 27, 2014, (pp. 3) http://www.crunchbase.com/organization/meetey.
Wikipedia entry Patch Media website—Aug. 27, 2014 (pp. 2) http://en.wikipedia.org/wiki/Patch_Media.
Wikipedia entry Yahoo! Groups website—Aug. 27, 2014 (pp. 7) http://en.wikipedia.org/wiki/Yahoo_groups.
Palo Alto News on Topix, Aug. 27, 2014, (pp. 3) http://www.topix.com/palo-alto.
Screenshot of My Neighbourhoods on Crunch Base, Aug. 27, 2014 (pp. 2) http://www.crunchbase.com/organization/my-neighbourhoods.
Screenshot of Dehood website, Aug. 27, 2014, (p. 1) http://www.dehood.com/home.
Wikipedia entry the Freecycle Network website—Aug. 27, 2014 (pp. 3) http://en.wikipedia.org/wiki/The_Freecycle_Network.
eDirectree Brings Group Wiki Twist to Social Networking, Techcrunch Article, Feb. 1, 2008 by Mark Hendrickson, (pp. 2) http://techcrunch.com/2008/02/01/edirectree-brings-group-wiki-twist-to-social-networking/.
Wikipedia entry Meetup website—Aug. 27, 2014 (p. 1) http://en.wikipedia.org/wiki/Meetup_(website).
Wikipedia entry Google Maps website—Aug. 27, 2014 (p. 18) http://en.wikipedia.org/wiki/Google_Maps.
Screenshot of Facebook website for groups, Aug. 27, 2014, (p. 1) https://www.facebook.com/about/groups.
Facebook Engineers bring Google+ Circles to Facebook, Article on ZDNet by Emil Protalinski, Jul. 3, 2011, (pp. 2) http://www.zdnet.com/blog/facebook/facebook-engineers-bring-google-circles-to-facebook/1885.
Screenshots of Uber website, Aug. 27, 2014, (pp. 5) https://www.uber.com/.
Screenshot of Lyft website, Aug. 27, 2014, (pp. 5) https://www.lyft.com/.
Wikipedia entry Google driverless car—Aug. 27, 2014 (pp. 4) http://en.wikipedia.org/wiki/Google_driverless_car.
Wikipedia entry Uber (company)—Aug. 27, 2014 (pp. 7) http://en.wikipedia.org/wiki/Uber_(company).
Wikipedia entry Autonomous car—Aug. 27, 2014 (pp. 15) http://en.wikipedia.org/wiki/Autonomous_car.
Screenshot of sidecar website, Aug. 27, 2014 (p. 1) http://www.sidecar.com/.
Screenshot of patch media website, Aug. 27, 2014 (pp. 6) http://patch.com/.
Screenshot of i-neighbors website, Aug. 27, 2014 (pp. 3) https://www.i-neighbors.org/howitworks.php.
http://www.zdnet.com/news/perspective-social-networking-for-all/149441.
http://www.remax.com/advancedsearch/.
http://global.remax.com/AdvancedListingSearch.aspx.
http://www.magicbricks.com/property-requirement-to-buy-rent/residential-commercial.
http://www.mapmyindia.com/solutions/tracking-lbs/vehicle-tracking.
http://www.mapmyindia.com/solutions/tracking-lbs/asset-tracking.
http://www.mapmyindia.com/solutions/enterprises/geo-tagging.
http://www.zillow.com/.
http://www.zillow.com/homes/for_rent/.
http://www.zillow.com/homes/for_sale/days_sort/53.409532,-64.072266,19.352611,-129.550781_rect/3_zm/.
http://www.trulia.com/home_prices/.
http://www.trulia.com/for_rent/New_York, NY.
http://www.realtor.com/rentals.
http://www.realtor.com/realestateforsale.
http://www.househunt.com/.
http://www.coldwellbanker.com/real_estate_search;jsessionid=S8ok3kaZtBh5GKHoo-Yzo28Z.sky-node04.
http://www.switchboard.com/.
http://www.anywho.com/whitepages.
http://wp.superpages.com/.
http://www.whitepages.com/.
http://www-personal.umich.edu/~ladamic/papers/socialsearch/adamicsocialsearch.pdf.
http://cs.wellesley.edu/~cs315/315_PPTs/L19-SocialNetworks/Stuff/wellesley.pdf.

(56) References Cited

OTHER PUBLICATIONS http://citeseerx.ist.psu.edu/viewdoc/download?doi=10.1.1.98.5230&rep=rep1&type=pdf.

http://www.ece.lsu.edu/xinli/Research/HeatMap_TVCG06.pdf.

http://www.usa-people-search.com/.

https://www.i-neighbors.org/.

"Friends and Neighbors on the Web", 2001 by Lada A. Adamic et al. (pp. 9) http://www.hpl.hp.com/research/idl/papers/web10/fnn2.pdf.

"A social influence model of consumer participation in network- and small-group-based virtual communities", International Journal of Research in Marketing, 2004 by Utpal M, Dholakia et al. (pp. 23) http://www-bcf.usc.edu/~douglast/620/bettina1.pdf.

"BuzzMaps: a prototype social proxy for predictive utility", ACM Digital Library, 2003 by Azzari Caillier Jarrett et al. (Pages) http://dl.acm.org/citation.cfm?id=948547&dl=ACM&coll=DL&CFID=456946313&CFTOKEN=50139062.

"Direct Annotation: A Drag-and-Drop Strategy for Labeling Photos", University of Maryland, 2000 by Ben Shneiderman et al. (pp. 8) http://hcil2.cs.umd.edu/trs/2000-06/2000-06.pdf.

"Notification for Shared Annotation of Digital Documents", Technical Report MSR—TR-2001-87, Sep. 19, 2001 by A. J. Bernheim Brush et al. (pp. 9) http://research.microsoft.com/pubs/69880/tr-2001-87.pdf.

"HT06, Tagging Paper, Taxonomy, Flickr, Academic Article, ToRead", Yahoo Research Berkeley, CA, 2006 by Cameron Marlow et al. (pp. 9) http://www.danah.org/papers/Hypertext2006.pdf.

"Computer Systems and the Design of Organizational Interaction", by Fernando Flores et al. (pp. 20) http://cpe.njit.edu/dlnotes/CIS/CIS735/ComputerSystemsandDesign.pdf.

"ChipIn—the easy way to collect money", Louis' Really Useful Finds, Mar. 12. (p. 1) http://reallyusefulthings.tumblr.com/post/28688782/chipin-the-easy-way-to-collect-money.

"Crowdsourcing: Those that are willing to test & learn will be those that will win", Newsline, Mar. 1, 2011by Neil Perkin http://mediatel.co.uk/newsline/2011/03/01/crowdsourcing-those-that-are-willing-to-test-learn-will-be-those-that-will-win/.

* cited by examiner

| AD-HOC NETWORK 112 | UNIQUE IDENTIFIER 302 | GEO-DEFINED AREA 304 | GEO-FENCE DATA 306 | SET OF AUTONOMOUS VEHICLES 108 | NO. OF AUTONOMOUS VEHICLES 308 | THRESHOLD NO. OF AUTONOMOUS VEHICLE 310 | FIRST NODE 312 |
|---|---|---|---|---|---|---|---|
| AHN1 | 6F9619FF-8B86-D011-B42D | A1 | $X_A,Y_A$<br>$X_B,Y_B$<br>$X_C,Y_C$<br>$X_D,Y_D$ | AV1<br>AV2<br>AV3 | 3 | YES | AV1 |
| AHN2 | 0E984725-C51C-4BF4-9960 | A2 | $X_D,Y_D$<br>$X_E,Y_E$<br>$X_F,Y_F$<br>$X_G,Y_G$ | AV4<br>AV5<br>AV6<br>AV7 | 4 | NO | AV4 |
| | | | | | | | |

NETWORK IDENTIFICATION TABLE 350

FIGURE 3

| SET OF AUTONOMOUS VEHICLES 108 | NO. OF AUTONOMOUS VEHICLES 308 | LOCAL INDEX 402 | UNIQUE IDENTIFIER 302 | OPERATIONAL MODE 404 | ERROR CONDITION 116 | STATUS DATA 408 |
|---|---|---|---|---|---|---|
| 1 | 4 | AV1<br>AV2<br>AV3<br>AV4 | 6F9619FF-8B86-D011-B42D | AV1 - OK<br>AV2 - OK<br>AV3 – ERROR CONDITION<br>AV4 - OK | Mechanical Failure – AV3 (Communicated by AV2) | Safe Mode Entered – AV3 |
| 2 | 3 | AV6<br>AV7<br>AV8 | 0E984725-C51C-4BF4-9960 | AV6 - OK<br>AV7 - OK<br>AV8 - OK | None | OK |
| | | | | | | |

TABLE VIEW 450

FIGURE 4

CENTRAL SERVER
100
MEMORY
102
DATABASE
106
PROCESSOR
104
PEER-TO-PEER
COMMUNICATION SESSION
114
WIDE AREA
NETWORK
101
ROAD
602
EMERGENCY
COMMANDS
604
ERROR
CONDITION
116
ERROR
CONDITION
116
NON-FUNCTIONAL
AUTONOMOUS
VEHICLE
118
SAFE MODE
606
SAFE
PARKING
LOCATION
608
NON-FUNCTIONAL
AUTONOMOUS
VEHICLE 118
GRAPHICAL PROCESS
FLOW
650

DISTRIBUTED COMMUNICATION OF INDEPENDENT AUTONOMOUS VEHICLES TO PROVIDE REDUNDANCY AND PERFORMANCE

FIELD OF TECHNOLOGY

This disclosure relates generally to the technical fields of communications and, in one example embodiment, to a method, apparatus, and system of distributed communication of independent autonomous vehicles to provide redundancy and performance.

BACKGROUND

The development and/or use of autonomous vehicles may be impeded by a lack of an effective system and/or method for addressing errors and/or failures of autonomous vehicles operating in an immediate area of other autonomous vehicles. Failing autonomous vehicles may not be able to communicate failures to a server and/or other autonomous vehicles operating in the immediate area. This may cause information of failed and/or failing autonomous vehicles to be lost. As a result, progress toward safe and/or effective autonomous vehicle use may be hindered and/or opportunities for technological, societal, and/or monetary advancement may be lost.

SUMMARY

A method, device and system of distributed communication of independent autonomous vehicles to provide redundancy and performance.

In one aspect, a system includes an ad-hoc network and a set of autonomous vehicles operating in a geographically proximate area through which peer-to-peer communication sessions are established between nearby ones of the set of autonomous vehicles through the ad-hoc network based on a present geo-spatial location of each one of the set of autonomous vehicles in communication proximity to preferred adjacent ones of the set of autonomous vehicles. The system further includes a wide area network and a central server directly coupled to each of the set of autonomous vehicles to establish centralized communication paths with each of the set of autonomous vehicles through the wide area network. The central server processes a communication from adjacent ones of the set of autonomous vehicles when an error condition is detected in an operational mode of a non-functional vehicle that has lost communication with the central server due to network failure, a hardware failure, a mechanical failure, and an electrical failure.

A communication preference between each of the adjacent ones of the set of autonomous vehicles in the ad-hoc network may be based on a closest physical proximity of active ones of the set of autonomous vehicles. The communication sessions established between the adjacent ones of the set of autonomous vehicles may be established in a manner that provides a geo-spatial data, a status data, and/or a telemetry data to adjacent vehicles in the ad-hoc network through a redundant array of independent disk based algorithm based on an XOR method of recreating data stored on each of the adjacent vehicles operating in a present geo-spatial area defining each of the adjacent ones of the set of autonomous vehicles.

The adjacent ones of the set of autonomous vehicles may periodically refresh local indexes of available adjacent ones of the set of autonomous vehicles (such that the adjacent ones of the set of autonomous vehicles minimize local storage requirements associated with ones of the set of autonomous vehicles that are no longer adjacent based on a changed location of adjacent ones of the set of autonomous vehicles through state based logic that determines which adjacent ones of the set of autonomous vehicles have presently moved into an adjacently established ad-hoc network including a different set of adjacent ones of the set of autonomous vehicles).

The ad-hoc networks may maintain a unique identifier in a network identification table that may be published to the central server and/or associated adjacent ad-hoc networks. Each of the ad-hoc networks may maintain a geo-fenced region through which each ad-hoc network operates and/or shares geo-fence data with adjacent ad-hoc networks to minimize network geo-spatial overlap between adjacent ad-hoc networks. Each of the unique identifiers of the ad-hoc networks may automatically persist at a geo-defined area each of the ad-hoc networks are associated unique identifiers associated with a geo-defined region in which autonomous vehicles enter and/or depart.

A particular autonomous vehicle may determine if there exists a threshold number of other autonomous vehicles in a particular ad-hoc network when determining whether the particular autonomous vehicle should leave an existing ad-hoc network of the particular autonomous vehicle in a favor of an adjacent ad-hoc network to the existing ad-hoc network. The particular autonomous vehicle may automatically announce itself as a first node in the adjacent ad-hoc network when it is a first vehicle currently in the adjacent ad-hoc network and/or a communication link between the existing ad-hoc networks may be broken because of distance from a node in the existing ad-hoc network.

Each of autonomous vehicles in the existing ad-hoc network may serve as signal extenders by repeating a signal communication in the existing ad-hoc network to facilitate communication strength between autonomous vehicles in the existing ad-hoc network. Each of the autonomous vehicles in the existing ad-hoc network may prefer communications through the existing ad-hoc network instead of communications to the central server when communicating commands related to a transient operational condition of each of the autonomous vehicles, operational instructions that are unlikely to be required beyond a current trip session of each of the autonomous vehicles, and/or based on a privacy preference of owners of each of the autonomous vehicles. The owners of each of the autonomous vehicles may optionally elect to opt-out of networked communications in any of the ad-hoc network and/or the wide area network.

The adjacent ones of the set of autonomous vehicles may automatically transmit emergency commands to the non-functional vehicle when the error condition is detected to permit the non-functional vehicle to enter a safe-mode and navigate to a safe parking location determined based on a visual mapping, a telemetric mapping, and/or a sensory fusion algorithm determining where exists the safe parking location. The set of autonomous vehicles may be a multi-rotor aircraft, a neighborhood rover, an autonomous boat, an autonomous submarine, and/or an autonomous passenger vehicle.

In another aspect, a system includes an ad-hoc network and a set of autonomous vehicles operates in a geographically proximate area through which peer-to-peer communication sessions are established between nearby ones of the set of autonomous vehicles through the ad-hoc network based on a present geo-spatial location of each one of the set of autonomous vehicles in communication proximity to preferred adjacent ones of the set of autonomous vehicles. A wide area network and a central server communicatively coupled with each of the set of autonomous vehicles to establish centralized communication paths with each of the set of autonomous vehicles through the wide area network. The central server processes a communication from adjacent ones of the set of autonomous vehicles when an error condition is detected in an operational mode of a non-functional vehicle that has lost communication with the central server. A communication preference between each of the adjacent ones of the set of autonomous vehicles is based on a closest physical proximity of active ones of the set of autonomous vehicles.

In yet another aspect, a method establishes peer-to-peer communication sessions between nearby ones of a set of autonomous vehicles operating in a geographically proximate area, through an ad-hoc network, based on a present geo-spatial location of each one of the set of autonomous vehicles in communication proximity to preferred adjacent ones of the set of autonomous vehicles. Centralized communication paths are established with each of the set of autonomous vehicles through a wide area network, using a central server directly coupled to each of the set of autonomous vehicles. A communication from adjacent ones of the set of autonomous vehicles using the central server when an error condition is detected in an operational mode of a non-functional vehicle that has lost communication with the central server due to a network failure, a hardware failure, a mechanical failure, and an electrical failure.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 3 shows a network identification table illustrating data relationships between the ad-hoc network and the set of autonomous vehicles of FIG. 1, according to one embodiment.

FIG. 4 is a table view illustrating the data relationships between the set of autonomous vehicles, the ad-hoc network, and the communication session of FIG. 1, according to one embodiment.

Other features of the present embodiments will be apparent from the accompanying drawings and from the detailed description that follows.

DETAILED DESCRIPTION

Figure 1:
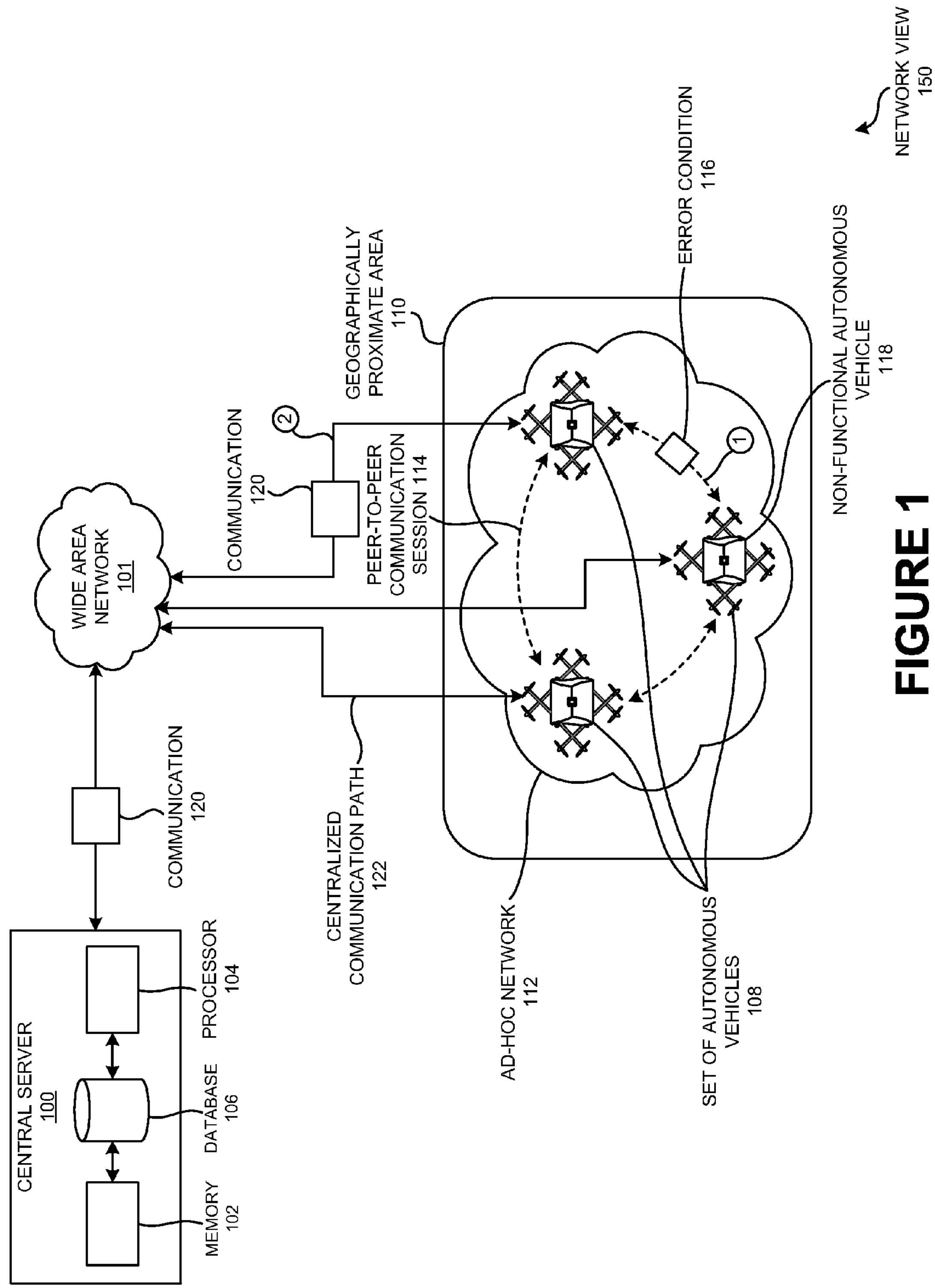
FIG. 1 is a network view of a communication being sent to a central server by at least one of a set of autonomous vehicles, each of the set of autonomous vehicles being communicatively coupled with one another through peer-to-peer communication sessions in an ad-hoc network, according to one embodiment.

Disclosed are a method and system of distributed communication of independent autonomous vehicles to provide redundancy and performance, according to one embodiment. FIG. 1 is a network view 150 of a communication being sent to a central server by at least one of a set of autonomous vehicles, each of the set of autonomous vehicles being communicatively coupled with one another through peer-to-peer communication sessions in an ad-hoc network, according to one embodiment. In particular, FIG. 1 shows a central server 100, a wide area network 101, a memory 102, a processor 104, a database 106, a set of autonomous vehicles 108, a geographically proximate area 110, an ad-hoc network 112, a peer-to-peer communication session 114, an error condition 116, a non-functional autonomous vehicle 118, a communication 120, and a centralized communication path 122.

FIG. 1 illustrates a number of operations between the central server 100 and/or ones of the set of autonomous vehicles 108. The set of autonomous vehicles 108 may include any number of autonomous vehicles 200 operating in a geographically proximate area 110 and/or an ad-hoc network 112. In one embodiment, autonomous vehicles 200 (shown in FIG. 2) of the set of autonomous vehicles 108 may need to be part of a communication network and/or coupled with and/or recognized by the central server 100. Peer-to-peer communication sessions 114 may be established between each of the set of autonomous vehicles 108 through the ad-hoc network 112. The peer-to-peer communication sessions 114 may be established based on a present geo-spatial location 708 of each of the ones of the set of autonomous vehicles 108 (e.g., based on the present geo-spatial location 708 being in the geographically proximate area 110 and/or geo-defined region of the ad-hoc network 112).

The peer-to-peer communication sessions 114 may enable geo-spatial data 504, telemetry data 506, and/or status data 408 to be communicated to and/or stored on other autonomous vehicles 200 of the set of autonomous vehicles 108 without need of the wide area network 101 and/or the central server 100. In one embodiment, autonomous vehicles 200 of the set of autonomous vehicles 108 may prefer the peer-to-peer communication sessions 114 over the centralized communication path 122 for relaying certain data (e.g., data that may only be relevant for a particular time, trip and/or context).

Circle '1' of FIG. 1 illustrates an error condition 116 being detected in an operational mode 404 of the non-functional autonomous vehicle 118 through the ad-hoc network 112 (e.g., being communicated from the non-functional autonomous vehicle 118 to another vehicle of the set of autonomous vehicles 108 via the peer-to-peer communication session 114). The error condition 116 may be communicated and/or detected when the non-functional autonomous vehicle 118 loses communication with the central server 100 and/or may be associated with an operational mode 404 of the non-functional autonomous vehicle 118 that has lost communication with the central server 100. The loss of communication with the central server 100 may be due to a network failure, a hardware failure, a mechanical failure, and an electrical failure. The error condition 116 may be indicated (e.g., communicated) to all autonomous vehicles 200 of the set of autonomous vehicles 108 and/or to a particular autonomous vehicle 200 (e.g., the autonomous vehicle 200 in a closest physical proximity 510 to the non-functional autonomous vehicle 118 and/or a designated node of the set of autonomous vehicles 108).

In one embodiment, centralized communication paths 122 may be established between each ones of the set of autonomous vehicles 108 and the central server 100 through the wide area network 101 (e.g., an Internet protocol network). Circle '2' shows the communication 120 being sent by the autonomous vehicle 200 of the set of autonomous vehicles 108 through the centralized communication path 122 to the central server 100. The autonomous vehicle 200 that detects the error condition 116 in the operational mode 404 of the non-functional autonomous vehicle 118 may communicate instructions back to the non-functional autonomous vehicle 118 and/or may send the communication 120 to the central server 100 through the centralized communication path 122. In one embodiment, only one communication 120 may be relayed through the wide area network 101 to the central server 100. For example, by the designated node and/or autonomous vehicle 200 that received the error condition 116 indication may send the communication 120 to the central server 100. The communication 120 may include the detected error condition 116, data communicated in the peer-to-peer communication sessions 114, and/or data regarding the status of each of the autonomous vehicles 200 in the set of autonomous vehicles 108. The decentralized communication paths and centralized communication paths 122 may work in concert to provide distributed communication of independent autonomous vehicles 200, providing redundancy and performance.

Figure 2:
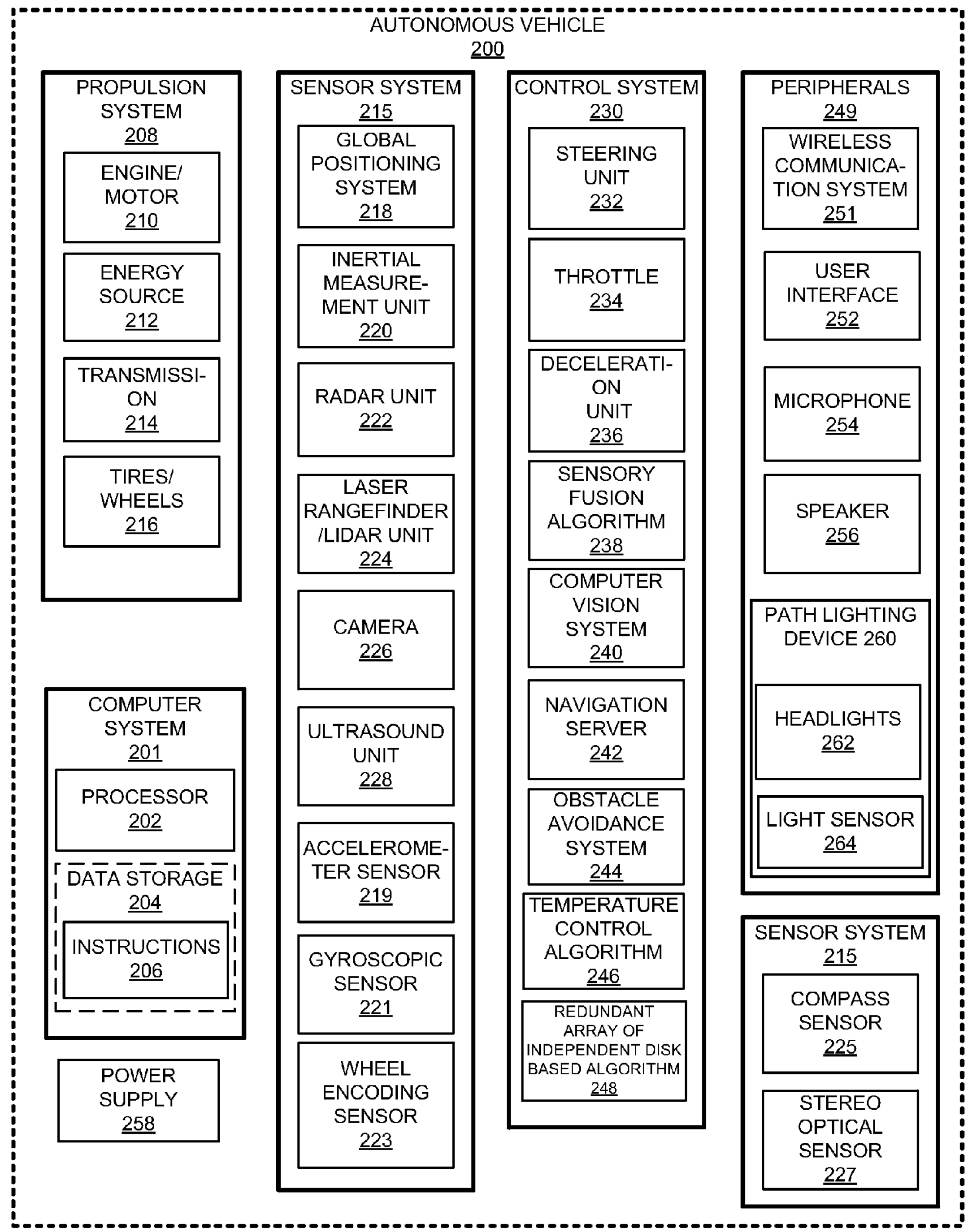
FIG. 2 is a functional block diagram illustrating an autonomous vehicle, according to an example embodiment.

FIG. 2 is a functional block diagram 250 illustrating an autonomous vehicle, according to an example embodiment. The autonomous vehicle 200 (e.g., one of the set of autonomous vehicles 108) could be configured to operate fully or partially in an autonomous mode. For example, the autonomous vehicle 200 (e.g., a land-based vehicle, an aquatic vehicle and/or an aerial vehicle) could control itself while in the autonomous mode, and may be operable to determine a current state of the autonomous vehicle 200 and/or its environment, determine a predicted behavior of at least one other entity (e.g., vehicle, pedestrian, biker, animal) in the environment, determine a confidence level that may correspond to a likelihood of the at least one other vehicle to perform the predicted behavior, and/or control the autonomous vehicle 200 based on the determined information. While in autonomous mode, the autonomous vehicle 200 may be configured to operate without human interaction.

The autonomous vehicle 200 could include various subsystems such as a computer system 201, a propulsion system 208, a sensor system 215, a control system 230, one or more peripherals 249, as well as a power supply 258. The autonomous vehicle 200 may include more or fewer subsystems and each subsystem could include multiple elements. Further, each of the subsystems and elements of autonomous vehicle 200 could be interconnected. Thus, one or more of the described functions of the autonomous vehicle 200 may be divided up into additional functional or physical components, or combined into fewer functional or physical components. In some further examples, additional functional and/or physical components may be added to the examples illustrated by FIG. 2.

The propulsion system 208 may include components operable to provide powered motion for the autonomous vehicle 200. Depending upon the embodiment, the propulsion system 208 could include an engine/motor 210, an energy source 212, a transmission 214, and/or tires/wheels 216. The engine/motor 210 could be any combination of an internal combustion engine, an electric motor, steam engine, Stirling engine, a solar powered engine, or other types of engines and/or motors. In some embodiments, the engine/motor 210 may be configured to convert energy source 212 into mechanical energy. In some embodiments, the propulsion system 208 could include multiple types of engines and/or motors. For instance, a gas-electric hybrid vehicle could include a gasoline engine and an electric motor. Other examples are possible.

The energy source 212 could represent a source of energy that may, in full or in part, power the engine/motor 210. That is, the engine/motor 210 could be configured to convert the energy source 212 into mechanical energy. Examples of energy sources 212 include gasoline, diesel, other petroleum-based fuels, propane, other compressed gas-based fuels, ethanol, solar panels, batteries, and other sources of electrical power. The energy source(s) 212 could additionally or alternatively include any combination of fuel tanks, batteries, capacitors, and/or flywheels. The energy source 212 could also provide energy for other systems of the autonomous vehicle 200.

The transmission 214 could include elements that are operable to transmit mechanical power from the engine/motor 210 to the wheels/tires 216. To this end, the transmission 214 could include a gearbox, clutch, differential, and drive shafts. The transmission 214 could include other elements. The drive shafts could include one or more axles that could be coupled to the one or more wheels/tires 216.

The wheels/tires 216 of autonomous vehicle 200 could be configured in various formats, including a unicycle, bicycle/motorcycle, tricycle, or a four-wheel format, a treaded system. Other wheel/tire geometries are possible, such as those including six or more wheels. Any combination of the wheels/tires 216 of autonomous vehicle 200 may be operable to rotate differentially with respect to other wheels/tires 216. The wheels/tires 216 could represent at least one wheel that is fixedly attached to the transmission 214 and at least one tire coupled to a rim of the wheel that could make contact with the driving surface. The wheels/tires 216 could include any combination of metal and rubber, or another combination of materials. In one embodiment, the wheels/tires 216 may include a wheel encoding sensor.

The sensor system 215 may include a number of sensors configured to sense information about the environment of the autonomous vehicle 200. For example, the sensor system 215 could include a Global positioning system (GPS) 218, an accelerometer sensor 219, an inertial measurement unit (IMU) 220, a gyroscopic sensor 221, a Radar unit 222, a wheel encoding sensor 223, a laser rangefinder/LIDAR unit 224, a compass sensor 225, a camera 226, a stereo optical sensor 227, and/or an ultrasound unit 228. The sensor system 215 could also include sensors configured to monitor internal systems of the autonomous vehicle 200 (e.g., O.sub.2 monitor, fuel gauge, engine oil temperature). Other sensors are possible as well. One or more of the sensors included in sensor system 215 could be configured to be actuated separately and/or collectively in order to modify a position and/or an orientation of the one or more sensors.

The GPS 218 may be any sensor configured to estimate a geographic location (e.g., geo-spatial data 504) of the autonomous vehicle 200. To this end, GPS 218 could include a transceiver operable to provide information regarding the position of the autonomous vehicle 200 with respect to the Earth. In one embodiment, the GPS 218 may be communicatively coupled with the central server 100 allowing a state of the autonomous vehicle 200 and/or a location of the autonomous vehicle 200 to be relayed to the server. In one embodiment, GPS 218 may be physically associated with the autonomous vehicle 200 so that the vehicle is able to periodically (e.g., continuously, every minute, at a predetermined point) communicate its location to the central server 100 through the wide area network 101 and/or a cellular network. In one embodiment, the global positioning system 218 may be communicatively coupled with the processor 202, a memory 102 (e.g., the data storage 204), the LIDAR unit 224, the RADAR unit 222, and/or the camera 226.

The IMU 220 (Internal Measurement Unit) could include any combination of sensors (e.g., accelerometers and gyroscopes) configured to sense position and orientation changes of the autonomous vehicle 200 based on inertial acceleration. In one embodiment, the IMU 220 may be used to calculate the magnitude of deceleration (e.g., controlled by the deceleration unit 236).

The Radar unit 222 may represent a system that utilizes radio signals to sense objects within the local environment of the autonomous vehicle 200. In some embodiments, in addition to sensing the objects, the Radar unit 222 may additionally be configured to sense the speed and/or heading of the objects. The Radar unit 222 may determine a range, an altitude, a direction, a shape, and/or speed of objects. In one embodiment, the autonomous vehicle 200 may be able to travel on sidewalks, bike lanes, the road 602, in streams, rivers, in the air, and/or may be able to stop at stop lights, wait to cross the road 602, navigate vehicle and/or pedestrian traffic, obey traffic laws etc. The autonomous vehicle 200 may have upon it infrared sensors, laser sensors and/or an on board navigation.

Similarly, the laser rangefinder/LIDAR unit 224 may be any sensor configured to sense objects in the environment in which the autonomous vehicle 200 is located using lasers. Depending upon the embodiment, the laser rangefinder/LIDAR unit 224 could include one or more laser sources, a laser scanner, and one or more detectors, among other system components. The laser rangefinder/LIDAR unit 224 could be configured to operate in a coherent (e.g., using heterodyne detection) or an incoherent detection mode. The LIDAR may use ultraviolet, visible and/or near infrared light to image objects in a degree field of view. The objects imaged by the LIDAR may include non-metallic objects, metallic objects, rocks, people, vehicles, rain, snow, traffic cones, traffic lights and/or signs etc. The LIDAR may be communicatively couple to the navigation server 242 to provide remote sensing capability to the autonomous vehicle 200 such that the autonomous vehicle 200 is autonomously navigable to the destination.

The camera 226 could include one or more devices configured to capture a plurality of images of the environment of the autonomous vehicle 200. The camera 226 could be a still camera 226 or a video camera 226. The camera 226 may be a set of cameras, a single multidirectional camera, a camera with a degree view, a rotating camera, a stereo optic camera etc. The control system 230 may be configured to control operation of the autonomous vehicle 200 and its components. Accordingly, the control system 230 could include various elements include steering unit, throttle 234, brake unit (e.g., the deceleration unit 236), a sensory fusion algorithm 238, a computer vision system 240, a navigation server 242, an obstacle avoidance system 244, and a temperature control algorithm 246.

The control system 230 may include a redundant array of independent disk based algorithm 248 to establish communication sessions between autonomous vehicles 200 (e.g., autonomous vehicles 200 of the set of autonomous vehicles 108). The redundant array of independent disk based algorithm 248 may be based on one or more XOR methods of recreating data stored on each of the adjacent vehicles operating in a present geo-spatial area (e.g., the geographically proximate area 110). The peer-to-peer communication sessions 114 may be established such that a geo-spatial data 504, a status data 408, and a telemetry data 506 may be communicated to adjacent vehicles in the ad-hoc network 112 using the communication sessions. In one embodiment, this data may be stored on the data storage 204 of autonomous vehicles 200 in the ad-hoc network 112 and/or may be recreated using the pieces of data stored across the set of autonomous vehicles 108. The redundant array of independent disk based algorithm 248 may work in concert with the wireless communication system 251 to communicate and/or store data (e.g., telemetry data 506, geo-spatial data 504, status data 408, and/or commands 706 related to a transient operational condition of each of the autonomous vehicles 200, operational instructions 206 that are unlikely to be required beyond a current trip session of each of the autonomous vehicles 200, and/or based on a privacy preference 704 of owners 702 of each of the autonomous vehicles 200).

The steering unit 232 could represent any combination of mechanisms that may be operable to adjust the heading of the autonomous vehicle 200. The throttle 234 could be configured to control, for instance, the operating speed of the engine/motor 210 and, in turn, control the speed of the autonomous vehicle 200. The brake unit could include any combination of mechanisms configured to decelerate the autonomous vehicle 200. The brake unit could use friction to slow the wheels/tires 216. In other embodiments, the brake unit could convert the kinetic energy of the wheels/tires 216 to electric current. The brake unit may take other forms as well.

The sensory fusion algorithm 238 may be an algorithm (or a computer program product storing an algorithm) configured to accept data from the sensor system 215 as an input. The data may include, for example, data representing information sensed at the sensors of the sensor system 215. The sensory fusion algorithm 238 could include, for instance, a Kalman filter, Bayesian network, or other algorithm. The sensory fusion algorithm 238 could further provide various assessments based on the data from sensor system 215. Depending upon the embodiment, the assessments could include evaluations of individual objects and/or features in the environment of autonomous vehicle 200, evaluation of a particular situation, and/or evaluate possible impacts based on the particular situation. The autonomous vehicle 200 may be able to adjust its path to avoid and/or intersect with the curb and/or sidewalk (e.g., traversing the curb to move from a bike lane to a sidewalk or vice versa). Other assessments are possible. The autonomous vehicle 200 may be able to use the sensory fusion algorithm 238 to use multiple sources of data to navigate intersections (e.g., while turning in an intersection) without use of lanes, painted lines, demarcated paths etc.

The computer vision system 240 may be any system operable to process and analyze images captured by camera 226 in order to identify objects and/or features in the environment of autonomous vehicle 200 that could include traffic signals, roadway boundaries, and obstacles. The computer vision system 240 could use an object recognition algorithm, a Structure From Motion (SFM) algorithm, video tracking, and other computer vision techniques. In some embodiments, the computer vision system 240 could be additionally configured to map an environment, track objects, estimate the speed of objects, etc. The navigation and pathing system (e.g., the navigation server 242) may be any system configured to determine a driving path for the autonomous vehicle 200. The navigation and pathing system may additionally be configured to update the driving path dynamically while the autonomous vehicle 200 is in operation. In some embodiments, the navigation and pathing system could be configured to incorporate data from the sensory fusion algorithm 238, the GPS 218, and one or more predetermined maps so as to determine the driving path for autonomous vehicle 200. The obstacle avoidance system 244 could represent a control system 230 configured to identify, evaluate, and avoid or otherwise negotiate potential obstacles (e.g., pedestrians, vehicles, bicycles, sidewalks (e.g., curbs, paved sidewalks), traffic cones, downed tree branches) in the environment of the autonomous vehicle 200. The control system 230 may additionally or alternatively include components other than those shown and described.

Peripherals 249 may be configured to allow interaction between the autonomous vehicle 200 and external sensors, other vehicles, other computer systems, and/or a user. For example, Peripherals 249 could include a wireless communication system 251, the user interface 252, a microphone 254, a speaker 256, and/or the path lighting device 260. The path lighting device 260 may be a set of headlights 262 and/or a light sensor 264 to detect that an environmental brightness is below a threshold luminosity. The speaker 256 may play a message recorded (e.g., through the microphone 254 and/or a mobile device and/or computer that sends the message to the autonomous vehicle 200). The microphone 254 may pick up and/or record noise from the autonomous vehicle 200's environment. The speaker 256 may play the message (e.g., a message from one passenger of an autonomous vehicle 200 to another passenger of another autonomous vehicle 200) and/or announce actions of the autonomous vehicle 200 (e.g., announce that the autonomous vehicle 200 is rerouting and/or arriving at a destination). In one embodiment, the autonomous vehicle 200 may have one or more turn signals and/or break lights.

The speaker 256, microphone 254, and/or the wireless communication system 251 (e.g., working in concert) may record and/or play an audio message (e.g., from an occupant of an adjacent autonomous vehicle 200), enable the use of voice commands to the autonomous vehicle 200 (e.g., navigation commands), and/or play a radio and/or a television. The wireless communication system 251 may enable the autonomous vehicle 200 to communicate through a network (e.g., the wide area network 101 and/or the ad-hoc network 112) with other autonomous vehicles 200 (e.g., in the ad-hoc network 112, within the geographically proximate area 110, and/or associated with the autonomous vehicle 200 and/or owner 702 (e.g., an autonomous vehicle 200 of a friend)). In one embodiment, this communication may be used to maximize efficiency of routes through collaborative communication of traffic patterns, communicate data, and/or to form a convoy.

In an example embodiment, the Peripherals 249 could provide, for instance, means for a user (e.g., the owner 702) of the autonomous vehicle 200 to interact with the user interface 252. To this end, the user interface 252 could provide information to a user of autonomous vehicle 200. The user interface 252 could also be operable to accept input from the user via a touchscreen. The touchscreen (e.g., the touchscreen 700) may be configured to sense at least one of a position and a movement of a user's finger via capacitive sensing, resistance sensing, or a surface acoustic wave process, among other possibilities. The touchscreen may be capable of sensing finger movement in a direction parallel or planar to the touchscreen surface, in a direction normal to the touchscreen surface, or both, and may also be capable of sensing a level of pressure applied to the touchscreen surface. The touchscreen may be formed of one or more translucent or transparent insulating layers and one or more translucent or transparent conducting layers. The touchscreen may take other forms as well.

In other instances, the Peripherals 249 may provide means for the autonomous vehicle 200 to communicate with devices within its environment. The microphone 254 may be configured to receive audio (e.g., a voice command or other audio input) from a user of the autonomous vehicle 200. Similarly, the speakers 256 may be configured to output audio to the user of the autonomous vehicle 200.

In one example, the wireless communication system 251 could be configured to wirelessly communicate with one or more devices directly or via a communication network. For example, wireless communication system 251 could use 3G cellular communication, such as CDMA, EVDO, GSM/GPRS, or 4G cellular communication, such as WiMAX or LTE. Alternatively, wireless communication system 251 could communicate with a wireless local area network (WLAN), for example, using WiFi. In some embodiments, wireless communication system 251 could communicate directly with a device, for example, using an infrared link, Bluetooth, or ZigBee. Other wireless protocols, such as various vehicular communication systems, are possible within the context of the disclosure. For example, the wireless communication system 251 could include one or more dedicated short range communication **120*s* (DSRC) devices that could include public and/or private data communications between vehicles and/or roadside stations. The wireless communication system 251 may also enable the autonomous vehicle 200 to communicate and/or coordinate with other autonomous vehicles 200 (e.g., through communication sessions over the ad-hoc network 112**).

The power supply 258 may provide power to various components of autonomous vehicle 200 and could represent, for example, a rechargeable lithium-ion, lithium-sulfur, or lead-acid battery. In some embodiments, one or more banks of such batteries could be configured to provide electrical power. Other power supply 258 materials and configurations are possible. In some embodiments, the power supply 258 and energy source 212 could be implemented together, as in some all-electric cars. In one embodiment, the autonomous vehicle 200 may autonomously direct itself to a charging station (e.g., a set non-transitory charging stations, a nearest charging station, a nearest preapproved (e.g., claimed) charging station) and/or conduct necessary operations to charge itself when an energy supply reaches a threshold level, at a certain time of day, when a certain amount of time has elapsed, when a certain distance has been traveled etc.

Many or all of the functions of autonomous vehicle 200 (e.g., the autonomous vehicle 200) could be controlled by computer system 201. Computer system 201 may include at least one processor 202 (which could include at least one microprocessor 104) that executes instructions 206 stored in a non-transitory computer readable medium, such as the data storage 204. The processor 202 may be communicatively coupled to the central server 100 through a wireless network (e.g., the network of FIG. 1) to autonomously navigate the autonomous vehicle 200 to a destination specified by the central server 100. The computer system 201 may also represent a plurality of computing devices that may serve to control individual components or subsystems of the autonomous vehicle 200 in a distributed fashion.

In some embodiments, data storage 204 may contain instructions 206 (e.g., program logic) executable by the processor 202 to execute various functions of autonomous vehicle 200, including those described above in connection with FIG. 2. Data storage 204 may contain additional instructions 206 as well, including instructions 206 to transmit data to, receive data from, interact with, and/or control one or more of the propulsion system 208, the sensor system 215, the control system 230, and the Peripherals 249. In addition to the instructions 206, the data storage 204 may store data such as roadway maps, path information, among other information. Such information may be used by the autonomous vehicle 200 and computer system 201 at during the operation of the autonomous vehicle 200 in the autonomous, semi-autonomous, and/or manual modes. The autonomous vehicle 200 may include a user interface 252 for providing information to or receiving input from a user of the autonomous vehicle 200. The user interface 252 could control or enable control of content and/or the layout of interactive images that could be displayed on the touchscreen. Further, the user interface 252 could include one or more input/output devices within the set of Peripherals 249, such as the wireless communication system 251, the touchscreen, the microphone 254, and the speaker 256.

The computer system 201 may control the function of the autonomous vehicle 200 based on inputs received from various subsystems (e.g., propulsion system 208, sensor system 215, and control system 230), as well as from the user interface 252. For example, the computer system 201 may utilize input from the control system 230 in order to control the steering unit to avoid an obstacle detected by the sensor system 215 and the obstacle avoidance system 244. Depending upon the embodiment, the computer system 201 could be operable to provide control over many aspects of the autonomous vehicle 200 and its subsystems. The components of autonomous vehicle 200 could be configured to work in an interconnected fashion with other components within or outside their respective systems. For instance, in an example embodiment, the camera 226 could capture a plurality of images that could represent information about a state of an environment of the autonomous vehicle 200 operating in an autonomous mode. The environment could include another vehicle. The computer vision system 240 could recognize the other vehicle as such based on object recognition models stored in data storage 204.

The computer system 201 could carry out several determinations based on the information. For example, the computer system 201 could determine one or more predicted behaviors of the other vehicle. The predicted behavior could be based on several factors including the current state of the autonomous vehicle 200 (e.g., vehicle speed, current lane, etc.) and the current state of the environment of the autonomous vehicle 200 (e.g., speed limit, number of available lanes, position and relative motion of other vehicles, etc.). For instance, in a first scenario, if another vehicle is rapidly overtaking the autonomous vehicle 200 from a left-hand lane, while autonomous vehicle 200 is in a center lane, one predicted behavior could be that the other vehicle will continue to overtake the autonomous vehicle 200 from the left-hand lane.

In a second scenario, if the other vehicle is overtaking autonomous vehicle 200 in the left-hand lane, but a third vehicle traveling ahead of autonomous vehicle 200 is impeding further progress in the left-hand lane, a predicted behavior could be that the other vehicle may cut in front of autonomous vehicle 200. The computer system 201 could further determine a confidence level corresponding to each predicted behavior. For instance, in the first scenario, if the left-hand lane is open for the other vehicle to proceed, the computer system 201 could determine that it is highly likely that the other vehicle will continue to overtake autonomous vehicle 200 and remain in the left-hand lane. Thus, the confidence level corresponding to the first predicted behavior (that the other vehicle will maintain its lane and continue to overtake) could be high, such as 90%.

In the second scenario, where the other vehicle is blocked by a third vehicle, the computer system 201 could determine that there is a 50% chance that the other vehicle may cut in front of autonomous vehicle 200 since the other vehicle could simply slow and stay in the left-hand lane behind the third vehicle. Accordingly, the computer system 201 could assign a 50% confidence level (or another signifier) to the second predicted behavior in which the other vehicle may cut in front of the autonomous vehicle 200.

In the example embodiment, the computer system 201 could work with data storage 204 and other systems in order to control the control system 230 based on at least on the predicted behavior, the confidence level, the current state of the autonomous vehicle 200, and the current state of the environment of the autonomous vehicle 200. In the first scenario, the computer system 201 may elect to adjust nothing as the likelihood (confidence level) of the other vehicle staying in its own lane is high. In the second scenario, the computer system 201 may elect to control autonomous vehicle 200 to slow down slightly (by reducing throttle 234) or to shift slightly to the right (by controlling steering unit) within the current lane in order to avoid a potential collision. Other examples of interconnection between the components of autonomous vehicle 200 are numerous and possible within the context of the disclosure.

Although FIG. 2 shows various components of autonomous vehicle 200, i.e., wireless communication system 251, computer system 201, data storage 204, and user interface 252, as being integrated into the autonomous vehicle 200, one or more of these components could be mounted or associated separately from the autonomous vehicle 200. For example, data storage 204 could, in part or in full, exist separate from the autonomous vehicle 200. Thus, the autonomous vehicle 200 could be provided in the form of device elements that may be located separately or together. The device elements that make up autonomous vehicle 200 could be communicatively coupled together in a wired and/or wireless fashion.

FIG. 3 shows a network identification table 350 illustrating data relationships between the ad-hoc network and the set of autonomous vehicles of FIG. 1, according to one embodiment. In particular, FIG. 3 shows a unique identifier 302, a geo-defined area 304, a geo-fence data 306, a number of autonomous vehicles 308, and a threshold number of autonomous vehicles 310.

Each ad-hoc network 112 may have an associated unique identifier 302 maintained in the network identification table. The network identification table may be published to the central server 100 and/or associated adjacent ad-hoc networks 112 (e.g., through the communication 120 sent through the centralized communication path 122). The unique identifier 302 of the ad-hoc network 112 may be associated with a geo-defined region in which autonomous vehicles 200 may enter/depart and/or may automatically persist at the geo-defined area 304 (e.g., defined by the geo-fence data 306 associated with the geo-defined region).

The geo-fence data 306 may define the geo-defined area 304, the geo-defined region and/or the geo-fenced region 502. The geo-fence data 306 may include a set of geo-spatial coordinates (e.g., geo-spatial coordinates defining the boundaries of the geo-fenced region 502). The number of autonomous vehicles 308 may be the amount of autonomous vehicles 200 operating in the ad-hoc network 112 and/or geo-defined area 304. The number of autonomous vehicles 308 may be the number of the set of autonomous vehicles 108. The threshold number of autonomous vehicles 310 may be a minimum and/or maximum number of autonomous vehicles 308.

In one embodiment, the autonomous vehicle 200 may determine whether the threshold number of autonomous vehicles 310 is satisfied before leaving the present ad-hoc network 112 for another ad-hoc network 112. The autonomous vehicle 200 may take into account the number of autonomous vehicles 308 existing in the present ad-hoc network 112 and/or in the other ad-hoc network 112. The autonomous vehicle 200 may prefer to change ad-hoc networks 112 if the change (e.g., loss of the autonomous vehicle 200 from the present ad-hoc network 112) will not drop the number of autonomous vehicles 308 of the present ad-hoc network 112 below the threshold number of autonomous vehicles 310 and/or will not cause the number of autonomous vehicles 308 of the other ad-hoc network 112 to exceed a threshold number of autonomous vehicles 310.

FIG. 4 is a table view 450 illustrating the data relationships between the set of autonomous vehicles, the ad-hoc network, and the peer-to-peer communication session of FIG. 1, according to one embodiment. FIG. 4 shows a local index 402, an operational mode 404, and a status data 408.

The set of autonomous vehicles 108 and/or each of the autonomous vehicles 200 of the set of autonomous vehicles 108 may store, access, and/or update the local index 402. In one embodiment, the local index 402 may include information regarding available autonomous vehicles 200 (e.g., autonomous vehicles of the set of autonomous vehicles 108). Autonomous vehicles 200 may use the abovementioned information to appropriately and/or optimally store information, minimizing storage requirements associated with autonomous vehicles 200 no longer available (e.g., due to changes in location of autonomous vehicles 200, changes in the number of autonomous vehicles 308 in a given ad-hoc network 112, and/or privacy preferences 704 of owners 702 of autonomous vehicles 200).

The operational mode 404 may be the status of the autonomous vehicle 200. Operational modes 404 may be an overall status and/or specific to particular systems of the autonomous vehicle 200 (e.g., electrical, mechanical, computer, hardware, and/or network (e.g., loss of connection with the central server 100). An error in the operational mode(s) 404 may be categorized as the error condition 116. The error condition 116 may include details regarding a nature of the error, a time of the error, and/or a request for correction of the error (e.g., from the central server 100 and/or an adjacent autonomous vehicle 200). The status data 408 may include information regarding the status of the autonomous vehicles 200 in the set of autonomous vehicles 108. The status data 408 may include update information regarding the operational mode 404 of the non-functional autonomous vehicle 118 and/or instructions 206 sent to the non-functional (e.g., emergency commands 604).

Figure 5:
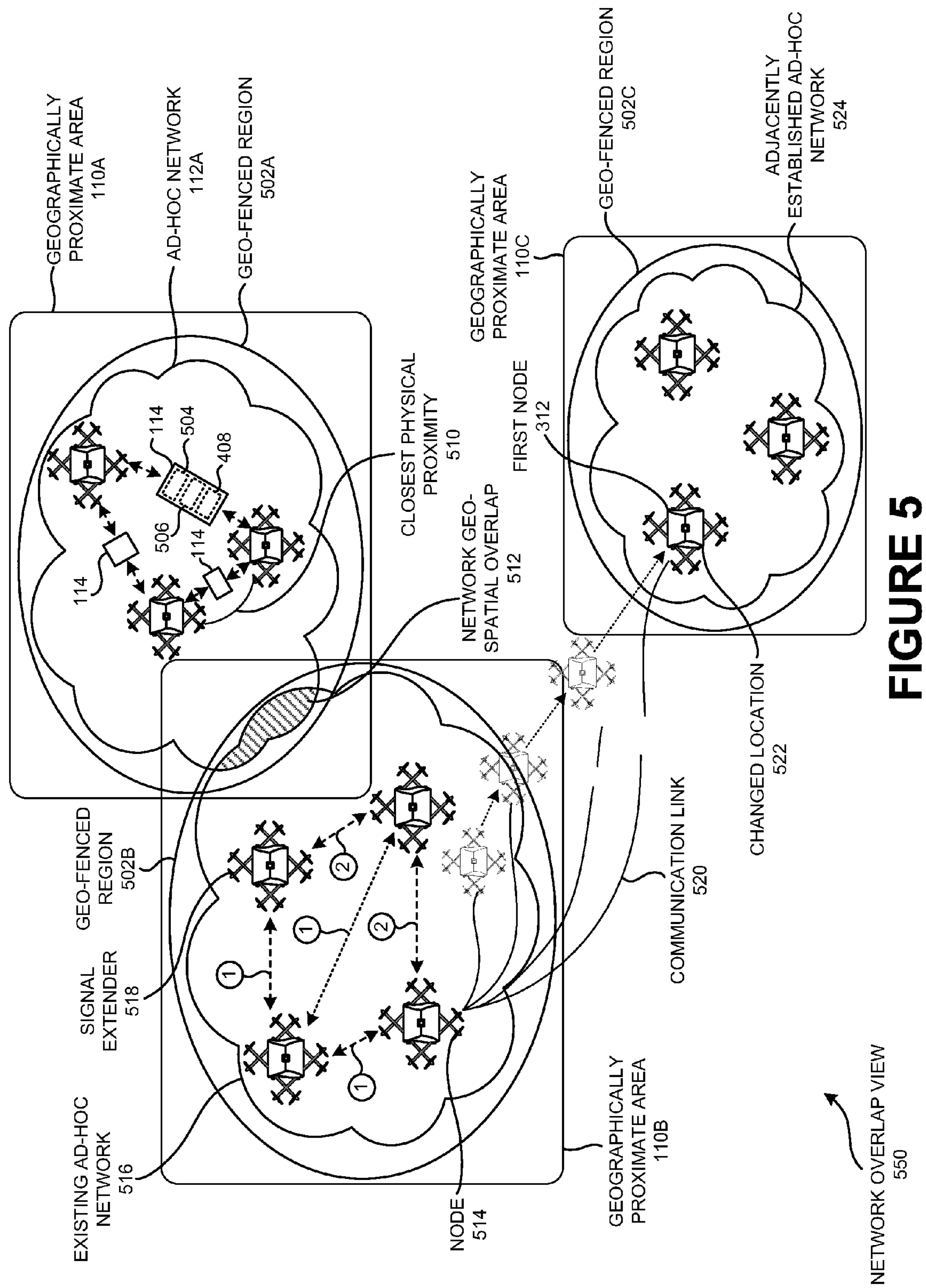
FIG. 5 is a network overlap view of a network geo-spatial overlap between two ad-hoc networks, according to one embodiment.

FIG. 5 is a network overlap view 550 of a network geo-spatial overlap between two ad-hoc networks, according to one embodiment. FIG. 5 shows a geo-fenced region 502A-C, a geo-spatial data 504, a telemetry data 506, a closest physical proximity 510, a network geo-spatial overlap 512, a node 514, an existing ad-hoc network 516, a signal extender 518, a communication link 520, a changed location 522, and an adjacently established ad-hoc network 524.

Ad-hoc network 112A may exist at the geo-fenced region 502A. The geo-fenced region 502A and/or the ad-hoc network 112A may be associated with a unique identifier 302. The geographically proximate area 110A may be and/or may include the geo-fenced region 502A. In one embodiment, the geo-spatial data 504, the status data 408, and/or the telemetry data 506 may be communicated through the peer-to-peer communication sessions 114. A communication preference between adjacent ones of the set of autonomous vehicles 108 may be based on the closest physical proximity 510 of active ones of the set of autonomous vehicles 108 (e.g., ones of the set of autonomous vehicles 108 indicated as available in the local index 402). The peer-to-peer communication session 114 may be generated between only a particular autonomous vehicle and/or the autonomous vehicle 200 in the closest physical proximity 510 to the particular autonomous vehicle.

Each ad-hoc network 112 may maintain the geo-fenced region 502 and/or share the geo-fence data 306 with other ad-hoc networks 112 in order to avoid and/or minimize the network geo-spatial overlap 512. The network geo-spatial overlap 512 may be an overlap of the ad-hoc networks 112, the geo-fenced regions 502, the geo-defined regions, the geo-defined areas 304, and/or the geographically proximate areas 110. In one embodiment, geo-fenced regions 502 (e.g., geo-defined regions and/or geo-defined areas 304) may be cooperatively adjusted in order to account for and/or correct network geo-spatial overlap 512. In one embodiment, a threshold level of network geo-spatial overlap 512 may be permitted. Autonomous vehicles 200 operating in the overlapping area may continue to operate under the original ad-hoc network 112 with which it was associated (e.g., the ad-hoc network 112 associated with the set of autonomous vehicles 108 of which the autonomous vehicle 200 operating in the network geo-spatial overlap 512 is part). In one embodiment, the autonomous vehicle 200 operating in the overlapping area may choose which ad-hoc network 112 to be associated with (e.g., by accounting for threshold number of autonomous vehicles 310 and/or planned route of the autonomous vehicle 200).

The existing ad-hoc network 516 may be an adjacent ad-hoc network 112 to the ad-hoc network 112A and/or the adjacently established ad-hoc network 524. In one embodiment, each ones of the set of autonomous vehicles 108 may perform as the signal extenders 518, repeating a signal communication (e.g., the peer-to-peer communication session 114) in the existing ad-hoc network 516 in order to strengthen communication between autonomous vehicles 200 in the existing ad-hoc network 516. In the example embodiment of FIG. 5, circle '1' shows the autonomous vehicle 200 in the top left area of the existing ad-hoc network 516 sending the signal communication in the existing ad-hoc network 516. The signal communication strength is strong between the autonomous vehicle 200 in the top left area and the adjacent autonomous vehicles. However, the communication strength is weak between the autonomous vehicle 200 in the top left area and the autonomous vehicle in the bottom right area. In circle '2,' the adjacent autonomous vehicles act as signal extenders 518, repeating the signal communication to the autonomous vehicle in the bottom right area. This practice of signal extension may enable communications (e.g., peer-to-peer communication sessions 114) in the existing ad-hoc network 516 to effectively reach all autonomous vehicles 200 in the existing ad-hoc network 516.

In one embodiment, an autonomous vehicle 200 may leave the existing ad-hoc network 516 in favor of the adjacently established ad-hoc network 524. The communication link 520 between the autonomous vehicle 200 that is leaving the existing ad-hoc network 516 and the existing as-hoc network may be broken based on distance between the autonomous vehicle 200 and the node 514 in the existing ad-hoc network 516. In one embodiment the distance may be a threshold distance from the node 514 (e.g., one of the set of autonomous vehicles 108 and/or the first node 312). The communication link 520 may be a link with others of the set of autonomous vehicles 108 and/or a link with the ad-hoc network 112.

In one embodiment, the distance may be a distance from the geo-fenced region 502B, the geo-defined area 304 associated with the existing ad-hoc location, and/or the geographically proximate area 110B. In one embodiment, the communication link 520 may be broken when the autonomous vehicle 200 enters the geographically proximate area 110C, the geo-fenced region 502C, and/or the geo-defined area 304 associated with the adjacently established ad-hoc network 524. The autonomous vehicle 200 leaving the existing ad-hoc network 516 may announce itself as the first node 312 in the adjacently established ad-hoc network 524 if the autonomous vehicle 200 is the first autonomous vehicle 200 currently in the adjacently established ad-hoc network 524 (e.g., when it reached the changed location 522). The autonomous vehicles 200 of the set of autonomous vehicles 108 associated with the existing ad-hoc network 516 may update local indexes 402 to account for the changed location 522 of the autonomous vehicle 200 that left the existing ad-hoc network 516 and is no longer an available autonomous vehicle 200.

Figure 6:
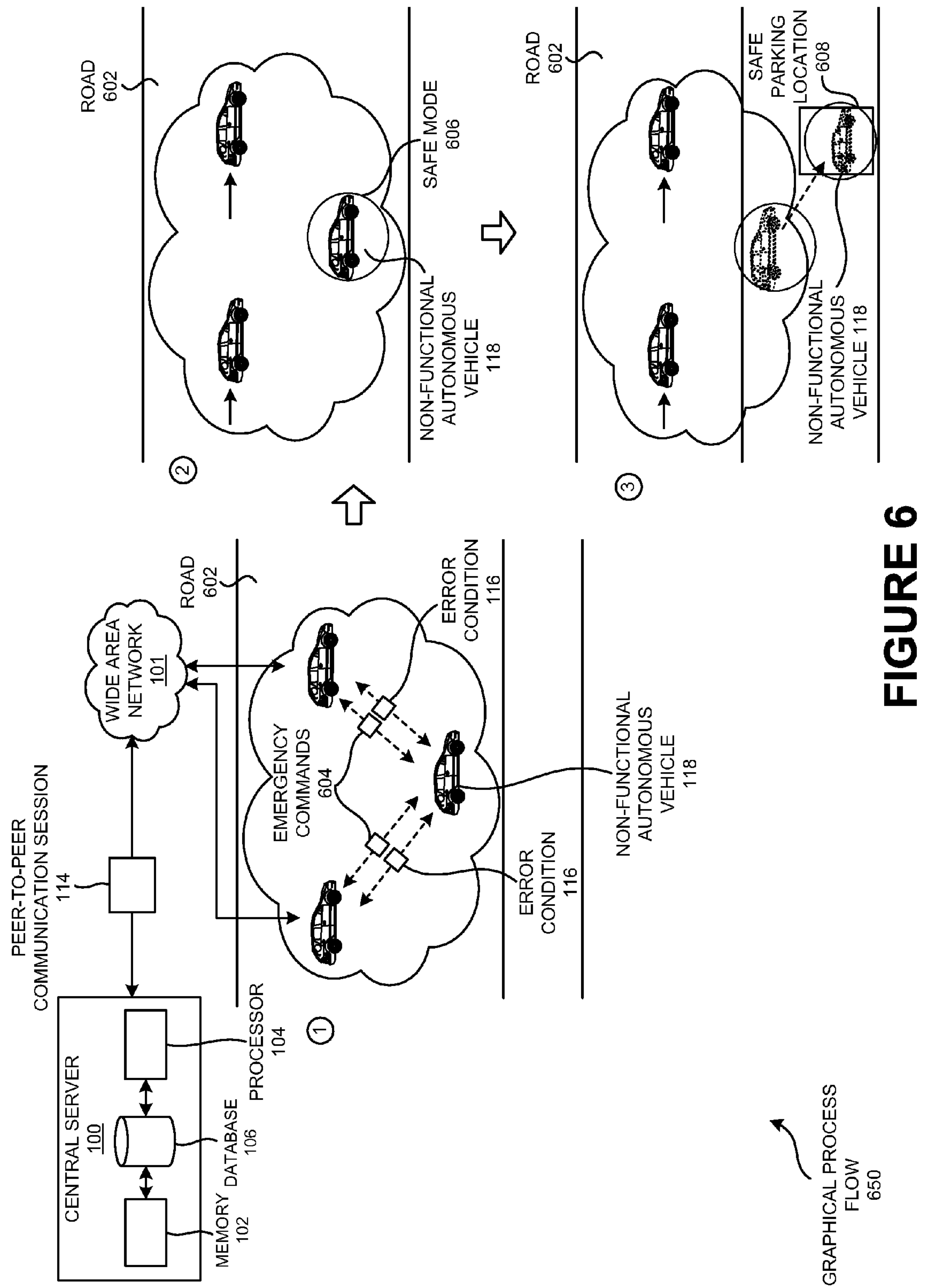
FIG. 6 is a graphical process flow of a non-functioning autonomous vehicle entering a safe mode and parking in a safe parking location, according to one embodiment.

FIG. 6 is a graphical process flow 650 of a non-functional autonomous vehicle of entering a safe mode and parking in a safe parking location, according to one embodiment. In particular, FIG. 6 shows a road 602, an emergency command 604, a safe mode 606, and a safe parking location 608.

In circle '1,' the non-functional autonomous vehicle 118 may communicate the error condition 116 of the operational mode 404 of the non-functional autonomous vehicle 118 to others of the set of autonomous vehicles 108 through the ad-hoc network 112 (e.g., through the peer-to-peer communication session 114 and/or signal communication). The others of the set of autonomous vehicles 108 may send the error command 604 in the communication 120 sent through the centralized communication path 122 to the central server 100. The others of the set of autonomous vehicles 108 may simultaneously communicate emergency commands 604 to the non-functional autonomous vehicle 118. The emergency commands 604 may include instructions 206 and/or data that may help and/or satisfy the needs of the non-functional autonomous vehicle 118. For example, the emergency commands 604 may include geo-spatial data 504, telemetry data 506, sensor data, and/or reboot instructions. In one embodiment, the emergency commands 604 may be communicated by a particular autonomous vehicle 200 (e.g., the first node 312 and/or the autonomous vehicle 200 in the closest physical proximity 510 with the non-functional autonomous vehicle 118). The autonomous vehicle(s) 200 communicating the emergency command 604 and/or the central server 100 may contact emergency services and/or repair services in response to the error condition 116 being detected.

In circle '2,' the non-functional autonomous vehicle 118 may enter the safe mode 606 using the emergency commands 604. The safe mode 606 may be a set of parameters (e.g., a speed, a set of geo-spatial directions, a proximity that must be kept between the non-functional autonomous vehicle 118 and other objects, and/or a communication setting) the non-functional autonomous vehicle 118 may be instructed to use in the case of an error in one or more operational modes 404. The emergency commands 604 may enable the central server 100 and/or other autonomous vehicles 200 to perform further diagnostics regarding the nature and/or details of the error condition 116. In one embodiment, the emergency commands 604 and/or safe mode 606 may enable other autonomous vehicles 200 and/or the central server 100 (e.g., using ones of the set of autonomous vehicles 108) to control and/or safely handle a malfunctioning autonomous vehicle 200 in the ad-hoc network 112 (e.g., an non-functional autonomous vehicle 118 not able to assess the situation and/or generate and/or execute instructions on its own).

In circle '3,' the non-functional autonomous vehicle 118 may exit its area of operation (e.g., the road 602) and/or park itself (e.g., using the emergency commands 604 and/or instructions associated with the safe made) in the safe parking location 608. The safe parking location 608 may be a predetermined location (e.g., a designated safe parking location 608) and/or a location determined to be the safe parking location 608. In one embodiment, the non-functional autonomous vehicle 118 may be instructed to determine (e.g., using the sensors of the non-functional autonomous vehicle 118) where the safe parking location 608 exists. Other autonomous vehicles 200 of the set of autonomous vehicles 108 may determine where the safe parking location 608 exists and/or the central server 100 may determine where the safe parking location 608 exists.

In one embodiment, the safe parking location 608 may be in the geographically proximate area 110, the geo-defined area 304, and/or the geo-fenced region 502 of the ad-hoc network 112. The central server 100 may use data from other autonomous vehicles and/or ad-hoc networks 112 (e.g., all autonomous vehicles 200 and/or ad-hoc networks 112) to determine an upcoming (e.g., in the path of the non-functional autonomous vehicle 118), closest and/or optimal safe parking location 608. The non-functional autonomous vehicle 118 may be removed from the ad-hoc network 112 once in the safe parking location 608 and/or may be passed off to the ad-hoc network 112 associated with the safe parking location 608 if the safe parking location 608 is not associated with the ad-hoc network 112 in which the non-functional autonomous vehicle 118 experienced the error condition 116.

Figure 7:
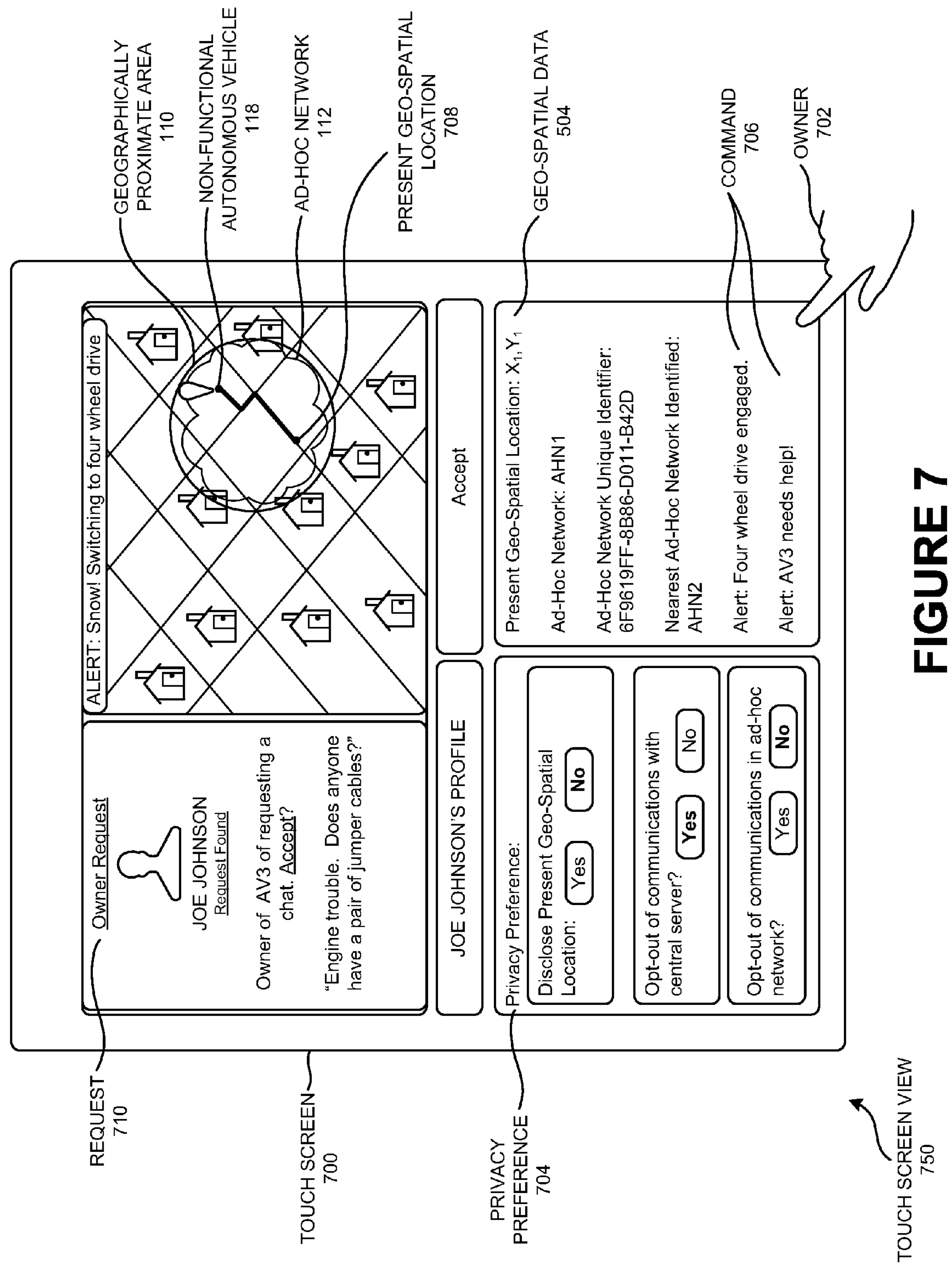
FIG. 7 is a touch screen view illustrating a command and a privacy preference of an owner, according to one embodiment.

FIG. 7 is a touch screen view 750 illustrating a command and a privacy preference of an owner, according to one embodiment. FIG. 7 shows a touch screen 700, an owner 702, a privacy preference 704, a command 706, a present geo-spatial location 708, and a request 710.

The touch screen 700 may be the user interface 252, a display screen of the autonomous vehicle 200 and/or a mobile device of the owner 702 (e.g., a smart phone, a tablet, and/or a laptop computer). The owner 702 may be the owner of the autonomous vehicle 200. While the example embodiment of FIG. 7 is given in regards to the owner 702, it will be appreciated that the example may apply to a user of the autonomous vehicle 200.

Autonomous vehicles 200 may prefer communications through the ad-hoc network 112 over communications through the centralized communication paths 122 when communicating commands 706 related to a transient operational condition of each of the autonomous vehicles 200, operational instructions 206 that are unlikely to be required beyond a current trip session of each of the autonomous vehicles 200, and/or based on a privacy preference 704 of owners 702 of each of the autonomous vehicles 200. In one embodiment, the touch screen 700 may update the owner 702 about commands 706 received through the ad-hoc network 112. For example, the autonomous vehicle 200 may receive information that there is snow in the geographically proximate area 110 and/or may switch to four wheel drive (e.g., an operational instruction that is unlikely to be required beyond a current trip session of each of the autonomous vehicles 200). The autonomous vehicle 200 may receive a command 706 related to a transient operational condition of each of the autonomous vehicles 200 and/or inform the owner 702 (e.g., "AV3 needs help!").

The owner 702 may be able to set the privacy preference 704 using the touch screen 700. The owner 702 may be able to opt-out of communications in the ad-hoc network 112 and/or with the central server 100 and/or to not disclose the present geo-spatial location 708 (e.g., geo-spatial data 504) of the autonomous vehicle 200. In one embodiment, the autonomous vehicle 200 may not be included in the set of autonomous vehicles 108 and/or may not be designated as an available autonomous vehicle 200 in a local index 402 if the owner 702 has opted-out of communications with the central server 100 and/or the ad-hoc network 112.

Owners 702 of autonomous vehicles 200 may be able to communicate through the ad-hoc network 112. In one embodiment, an owner 702 may send a request 710 (e.g., to communicate and/or a request 710 for a specific thing) to other owners 702 in the ad-hoc network 112. The owner 702 may be able to accept or deny the request 710 communicated by another owner 702. In one embodiment, the owner 702 may be able to choose what information associated with the autonomous vehicle 200 is shared through the centralized communication path 122 and/or the peer-to-peer communication sessions 114.

Figure 8:
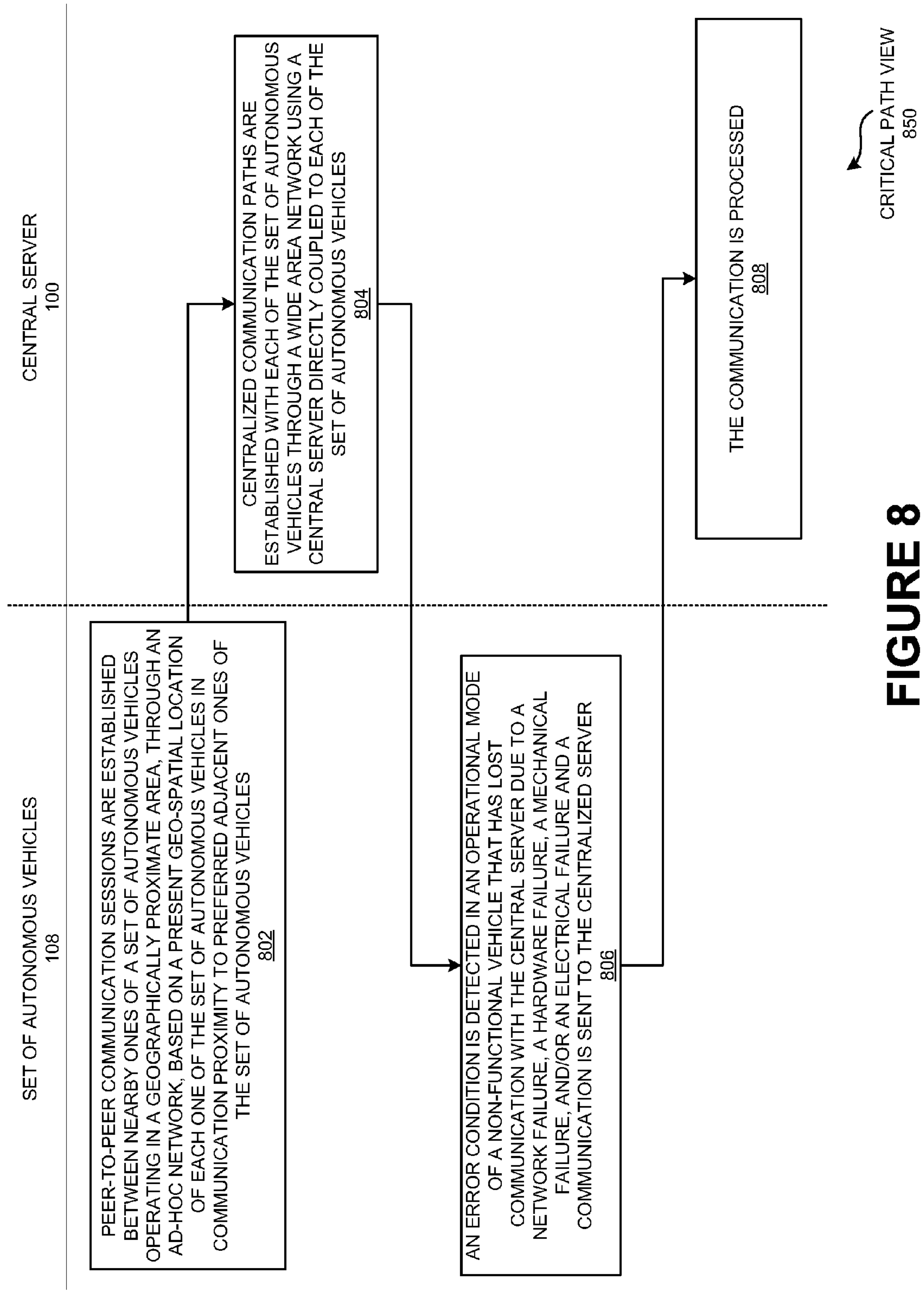
FIG. 8 is a critical path view illustrating a flow based on time in which critical operations in creating distributed communication of independent autonomous vehicles are established, according to one embodiment.

FIG. 8 is a critical path view 850 illustrating a flow based on time in which critical operations in creating distributed communication of independent autonomous vehicles 200 are established, according to one embodiment. Operation 802 may establish peer-to-peer communication sessions 114 between nearby ones of a set of autonomous vehicles 108 operating in a geographically proximate area 110, through an ad-hoc network 112, based on a present geo-spatial location 708 of each one of the set of autonomous vehicles 108 in communication proximity to preferred adjacent ones of the set of autonomous vehicles 108. Operation 804 may establish centralized communication paths 122 with each of the set of autonomous vehicles 108 through a wide area network 101 using a central server 100 directly coupled to each of the set of autonomous vehicles 108. Operation 806 may detect an error condition 116 in an operational mode 404 of a non-functional autonomous vehicle 118 that has lost communication with the central server 100 due to a network failure, a hardware failure, a mechanical failure, and/or an electrical failure and a communication 120 is sent to the centralized server. Operation 808 may process the communication 120.

Figure 9:
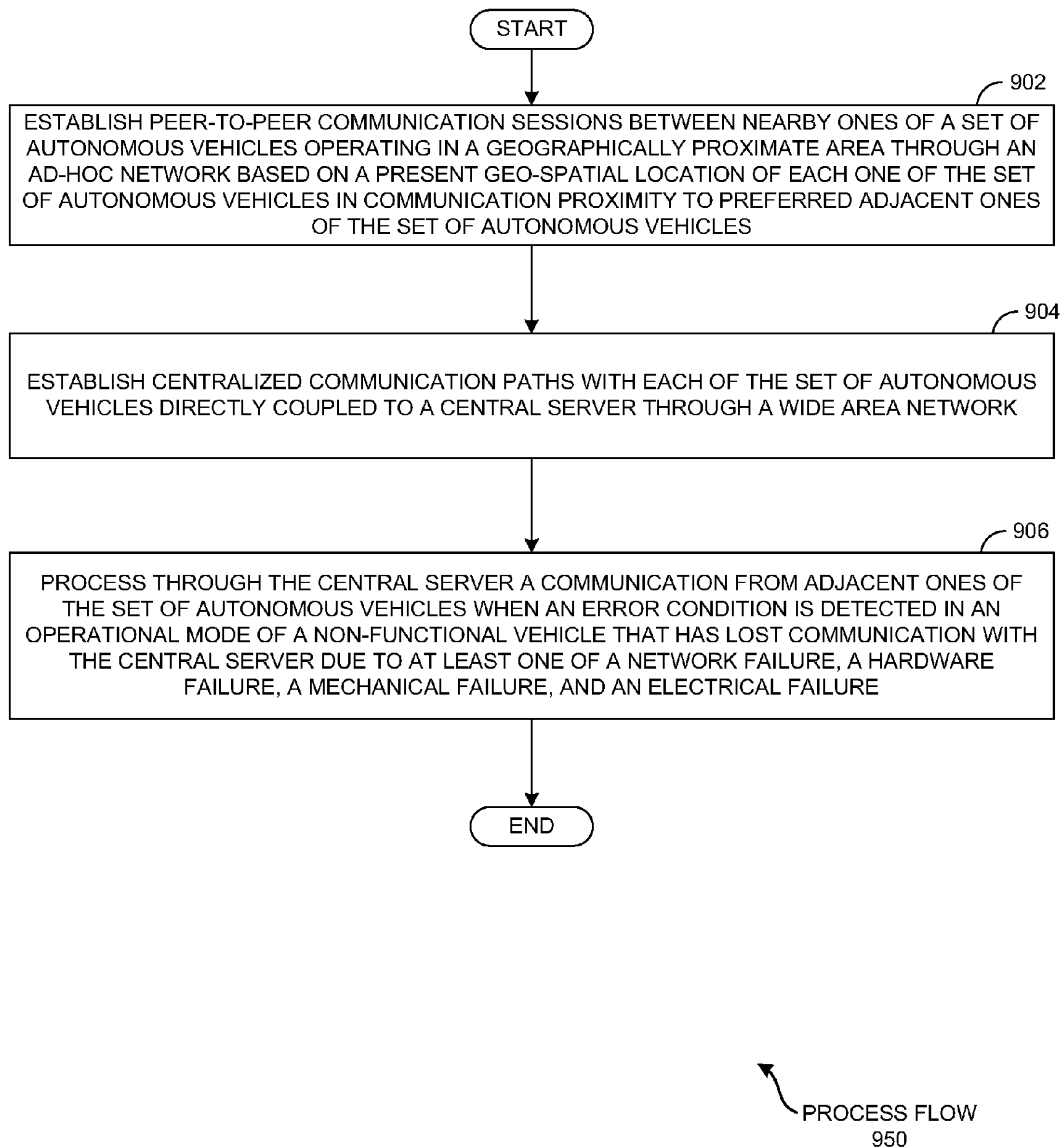
FIG. 9 is a process flow detailing the operations involving distributed communication of independent autonomous vehicles to provide redundancy and performance, according to one embodiment.

FIG. 9 is a process flow 950 detailing the operations involving distributed communication of independent autonomous vehicles 200 to provide redundancy and performance, according to one embodiment. Peer-to-peer communication sessions 114 may be established between nearby ones of a set of autonomous vehicles 108 operating in a geographically proximate area 110 through an ad-hoc network 112 based on a present geo-spatial location 708 of each one of the set of autonomous vehicles 108 in communication proximity to preferred adjacent ones of the set of autonomous vehicles 108 in operation 902. Centralized communication paths 122 may be established with each of the set of autonomous vehicles 108 directly coupled to a central server 100 through a wide area network 101 in operation 904. In operation 906, the central server 100 may process a communication 120 from adjacent ones of the set of autonomous vehicles 108 when an error condition 116 is detected in an operational mode 404 of a non-functional autonomous vehicle 118 that has lost communication with the central server 100 due to at least one of a network failure, a hardware failure, a mechanical failure, and an electrical failure.

Disclosed are a method, a device and/or a system of distributed communication of independent autonomous vehicles 200 to provide redundancy and performance. In one aspect, a system includes an ad-hoc network 112 and a set of autonomous vehicles 108 operating in a geographically proximate area 110 through which peer-to-peer communication sessions 114 are established between nearby ones of the set of autonomous vehicles 108 through the ad-hoc network 112 based on a present geo-spatial location 708 of each one of the set of autonomous vehicles 108 in communication proximity to preferred adjacent ones of the set of autonomous vehicles 108. The system further includes a wide area network 101 and a central server 100 directly coupled to each of the set of autonomous vehicles 108 to establish centralized communication paths 122 with each of the set of autonomous vehicles 108 through the wide area network 101. The central server 100 processes a communication 120 from adjacent ones of the set of autonomous vehicles 108 when an error condition 116 is detected in an operational mode 404 of a non-functional autonomous vehicle 118 that has lost communication with the central server 100 due to network failure, a hardware failure, a mechanical failure, and an electrical failure.

A communication preference between each of the adjacent ones of the set of autonomous vehicles 108 in the ad-hoc network 112 may be based on a closest physical proximity 510 of active ones of the set of autonomous vehicles 108. The peer-to-peer communication sessions 114 established between the adjacent ones of the set of autonomous vehicles 108 may be established in a manner that provides a geo-spatial data 504, a status data 408, and/or a telemetry data 506 to adjacent vehicles in the ad-hoc network 112 through a redundant array of independent disk based algorithm 248 based on an XOR method of recreating data stored on each of the adjacent vehicles operating in a present geo-spatial area defining each of the adjacent ones of the set of autonomous vehicles 108.

The adjacent ones of the set of autonomous vehicles 108 may periodically refresh local indexes 402 of available adjacent ones of the set of autonomous vehicles 108 (such that the adjacent ones of the set of autonomous vehicles 108 minimize local storage requirements associated with ones of the set of autonomous vehicles 108 that are no longer adjacent based on a changed location 522 of adjacent ones of the set of autonomous vehicles 108 through state based logic that determines which adjacent ones of the set of autonomous vehicles 108 have presently moved into an adjacently established ad-hoc network 524 including a different set of adjacent ones of the set of autonomous vehicles 108).

The ad-hoc networks 112 may maintain a unique identifier 302 in a network identification table that may be published to the central server 100 and/or associated adjacent ad-hoc networks 112. Each of the ad-hoc networks 112 may maintain a geo-fenced region 502 through which each ad-hoc network 112 operates and/or shares geo-fence data 306 with adjacent ad-hoc networks 112 to minimize network geo-spatial overlap 512 between adjacent ad-hoc networks 112. Each of the unique identifiers 302 of the ad-hoc networks 112 may automatically persist at a geo-defined area 304 each of the ad-hoc networks 112 are associated unique identifiers 302 associated with a geo-defined region in which autonomous vehicles 200 enter and/or depart.

A particular autonomous vehicle 200 may determine if there exists a threshold number of other autonomous vehicles 200 in a particular ad-hoc network 112 when determining whether the particular autonomous vehicle 200 should leave an existing ad-hoc network 516 of the particular autonomous vehicle 200 in a favor of an adjacent ad-hoc network 112 to the existing ad-hoc network 516. The particular autonomous vehicle 200 may automatically announce itself as a first node 312 in the adjacent ad-hoc network 112 when it is a first vehicle currently in the adjacent ad-hoc network 112 and/or a communication link 520 between the existing ad-hoc network 516*s* may be broken because of distance from a node 514 in the existing ad-hoc network 516.

Each of autonomous vehicles 200 in the existing ad-hoc network 516 may serve as signal extenders 518 by repeating a signal communication in the existing ad-hoc network 516 to facilitate communication strength between autonomous vehicles 200 in the existing ad-hoc network 516. Each of the autonomous vehicles 200 in the existing ad-hoc network 516 may prefer communications through the existing ad-hoc network 516 instead of communications to the central server 100 when communicating commands 706 related to a transient operational condition of each of the autonomous vehicles 200, operational instructions 206 that are unlikely to be required beyond a current trip session of each of the autonomous vehicles 200, and/or based on a privacy preference 704 of owners 702 of each of the autonomous vehicles 200. The owners 702 of each of the autonomous vehicles 200 may optionally elect to opt-out of networked communications in any of the ad-hoc network 112 and/or the wide area network 101.

The adjacent ones of the set of autonomous vehicles 108 may automatically transmit emergency commands 604 to the non-functional autonomous vehicle 118 when the error condition 116 is detected to permit the non-functional autonomous vehicle 118 to enter a safe-mode and navigate to a safe parking location 608 determined based on a visual mapping, a telemetric mapping, and/or a sensory fusion algorithm 238 determining where exists the safe parking location 608. The set of autonomous vehicles 108 may include one or more of a multi-rotor aircraft, a neighborhood rover, an autonomous boat, an autonomous submarine, and/or an autonomous passenger vehicle.

In another aspect, a system includes an ad-hoc network 112 and a set of autonomous vehicles 108 operates in a geographically proximate area 110 through which peer-to-peer communication sessions 114 are established between nearby ones of the set of autonomous vehicles 108 through the ad-hoc network 112 based on a present geo-spatial location 708 of each one of the set of autonomous vehicles 108 in communication proximity to preferred adjacent ones of the set of autonomous vehicles 108. A wide area network 101 and a central server 100 communicatively coupled with each of the set of autonomous vehicles 108 to establish centralized communication paths 122 with each of the set of autonomous vehicles 108 through the wide area network 101. The central server 100 processes a communication 120 from adjacent ones of the set of autonomous vehicles 108 when an error condition 116 is detected in an operational mode 404 of a non-functional autonomous vehicle 118 that has lost communication with the central server 100. A communication preference between each of the adjacent ones of the set of autonomous vehicles 108 is based on a closest physical proximity 510 of active ones of the set of autonomous vehicles 108.

In yet another aspect, a method establishes peer-to-peer communication sessions 114 between nearby ones of a set of autonomous vehicles 108 operating in a geographically proximate area 110, through an ad-hoc network 112, based on a present geo-spatial location 708 of each one of the set of autonomous vehicles 108 in communication proximity to preferred adjacent ones of the set of autonomous vehicles 108. Centralized communication paths 122 are established with each of the set of autonomous vehicles 108 through a wide area network 101, using a central server 100 directly coupled to each of the set of autonomous vehicles 108. A communication 120 from adjacent ones of the set of autonomous vehicles 108 using the central server 100 when an error condition 116 is detected in an operational mode 404 of a non-functional autonomous vehicle 118 that has lost communication with the central server 100 due to a network failure, a hardware failure, a mechanical failure, and an electrical failure.

An example embodiment will now be described. In one embodiment, Joe may own an autonomous car. Joe may be riding in his autonomous car when the autonomous car loses connection with the central server 100. Joe may be able to relax as the autonomous car relays the error condition 116 to other autonomous cars in the ad-hoc network 112 and the communication 120 is communicated to the central server. Joe's autonomous car may be able to continue to operate without incident (e.g., using the emergency commands 604) and/or need for user intervention. Information related to Joe's autonomous car may not be lost as a result of the loss of connection with the central server 100.

Although the present embodiments have been described with reference to specific example embodiments, it will be evident that various modifications and changes may be made to these embodiments without departing from the broader spirit and scope of the various embodiments. For example, the various devices, algorithms, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated ASIC circuitry and/or in Digital Signal; Processor DSP circuitry).

In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

What is claimed is:

1. A system, comprising:
an ad-hoc network;
a set of autonomous vehicles operating in a geographically proximate area through which peer-to-peer communication sessions are established between nearby ones of the set of autonomous vehicles through the ad-hoc network based on a present geo-spatial location of each one of the set of autonomous vehicles in communication proximity to preferred adjacent ones of the set of autonomous vehicles;
a wide area network; and
a central server directly coupled to each of the set of autonomous vehicles to establish centralized communication paths with each of the set of autonomous vehicles through the wide area network,
wherein the centralized server to process a communication from adjacent ones of the set of autonomous vehicles when an error condition is detected in an operational mode of a non-functional vehicle that has lost communication with the central server due to at least one of a network failure, a hardware failure, a mechanical failure, and an electrical failure, and
wherein the communication sessions established between the adjacent ones of the set of autonomous vehicles are established in a manner that provides at least one of a geo-spatial data, a status data, and a telemetry data to adjacent vehicles in the ad-hoc network through a redundant array of independent disk based algorithm based on at least one of an XOR method of recreating data stored on each of the adjacent vehicles operating in a present geo-spatial area defining each of the adjacent ones of the set of autonomous vehicles.

2. The system of claim 1:
wherein a communication preference between each of the adjacent ones of the set of autonomous vehicles in the ad hoc network is based on a closest physical proximity of active ones of the set of autonomous vehicles.

3. The system of claim 1:
wherein adjacent ones of the set of autonomous vehicles periodically refresh local indexes of available adjacent ones of the set of autonomous vehicles in a manner such that the adjacent ones of the set of autonomous vehicles minimize local storage requirements associated with ones of the set of autonomous vehicles that are no longer adjacent based on a changed location of adjacent ones of the set of autonomous vehicles through state based logic that determines which adjacent ones of the set of autonomous vehicles have presently moved into an adjacently established ad-hoc network comprising a different set of adjacent ones of the set of autonomous vehicles.

4. The system of claim 3:
wherein each of the ad-hoc networks maintain a unique identifier in a network identification table that is published to the central server and associated adjacent ad-hoc networks, and
wherein each of the ad-hoc networks maintain a geo-fenced region through which each ad-hoc network operates and shares geo-fence data with adjacent ad-hoc networks to minimize network geo-spatial overlap between adjacent ad-hoc networks.

5. The system of claim 4:
wherein each of the unique identifiers of the ad-hoc networks to automatically persist at a geo-defined area such that each of the ad-hoc networks are associated unique identifiers associated with a geo-defined region in which autonomous vehicles enter and depart.

6. The system of claim 5:
wherein a particular autonomous vehicle to determine if there exists a threshold number of other autonomous vehicles in a particular ad-hoc network when determining whether the particular autonomous vehicle should leave an existing ad-hoc network of the particular autonomous vehicle in a favor of an adjacent ad-hoc network to the existing ad-hoc network, and
wherein the particular autonomous vehicle to automatically announce itself as a first node in the adjacent ad-hoc network when it is a first vehicle currently in the adjacent ad-hoc network and a communication link between the existing ad-hoc network is broken because of distance from a node in the existing ad-hoc network.

7. The system of claim 6:
wherein each of autonomous vehicles in the existing ad-hoc network to serve as signal extenders by repeating a signal communication in the existing ad-hoc network to facilitate communication strength between autonomous vehicles in the existing ad-hoc network, and
wherein each of the autonomous vehicles in the existing ad-hoc network to prefer communications through the existing ad-hoc network instead of communications to the central server when communicating commands related to at least one of a transient operational condition of each of the autonomous vehicles, operational instructions that are unlikely to be required beyond a current trip session of each of the autonomous vehicles, and based on a privacy preference of owners of each of the autonomous vehicles.

8. The system of claim 7:
wherein each of the owners of each of the autonomous vehicles optionally elect to opt-out of networked communications in any of the ad-hoc network and the centralized network.

9. The system of claim 1:
wherein adjacent ones of the set of autonomous vehicles automatically transmit emergency commands to the non-functional vehicle when the error condition is detected to permit the non-functional vehicle to enter a safe-mode and navigate to a safe parking location determined based on at least one of a visual mapping, a telemetric mapping, and a sensory fusion algorithm determining where exists the safe parking location, and
wherein each of the set of autonomous vehicles is any one of a multi-rotor aircraft, a neighborhood rover, an autonomous boat, an autonomous submarine, and an autonomous passenger vehicle.

10. A system, comprising:
an ad-hoc network;
a set of autonomous vehicles operating in a geographically proximate area through which peer-to-peer communication sessions are established between nearby ones of the set of autonomous vehicles through the ad-hoc network based on a present geo-spatial location of each one of the set of autonomous vehicles in communication proximity to preferred adjacent ones of the set of autonomous vehicles;
a wide area network; and a central server communicatively coupled with each of the set of autonomous vehicles to establish centralized communication paths with each of the set of autonomous vehicles through the wide area network, wherein the centralized server to process a communication from adjacent ones of the set of autonomous vehicles when an error condition is detected in an operational mode of a non-functional vehicle that has lost communication with the central server, wherein a communication preference between each of the adjacent ones of the set of autonomous vehicles is based on a closest physical proximity of active ones of the set of autonomous vehicles, and wherein the communication sessions established between the adjacent ones of the set of autonomous vehicles are established in a manner that provides at least one of a geo-spatial data, a status data, and a telemetry data to adjacent vehicles in the ad-hoc network through a redundant array of independent disk based algorithm based on at least one of an XOR method of recreating data stored on each of the adjacent vehicles operating in a present geo-spatial area defining each of the adjacent ones of the set of autonomous vehicles.

11. The system of claim 10:

wherein the lost communication is due to at least one of a network failure, a hardware failure, a mechanical failure, and an electrical failure.

12. The system of claim 10:

wherein adjacent ones of the set of autonomous vehicles periodically refresh local indexes of available adjacent ones of the set of autonomous vehicles in a manner such that the adjacent ones of the set of autonomous vehicles minimize local storage requirements associated with ones of the set of autonomous vehicles that are no longer adjacent based on a changed location of adjacent ones of the set of autonomous vehicles through state based logic that determines which adjacent ones of the set of autonomous vehicles have presently moved into an adjacently established ad-hoc network comprising a different set of adjacent ones of the set of autonomous vehicles.

13. The system of claim 10:

wherein each of the ad-hoc networks maintain a unique identifier in a network identification table that is published to the central server and associated adjacent ad-hoc networks, wherein each of the ad-hoc networks maintain a geo-fenced region through which each ad-hoc network operates and shares geo-fence data with adjacent ad-hoc networks to minimize network geo-spatial overlap between adjacent ad-hoc network.

14. The system of claim 13:

wherein each of the unique identifiers of the ad-hoc networks to automatically persist at a geo-defined area such that each of the ad-hoc networks are associated unique identifiers associated with a geo-defined region in which autonomous vehicles enter and depart.

15. The system of claim 14:

wherein a particular autonomous vehicle to determine if there exists a threshold number of other autonomous vehicles in a particular ad-hoc network when determining whether the particular autonomous vehicle should leave an existing ad-hoc network of the particular autonomous vehicle in a favor of an adjacent ad-hoc network to the existing ad-hoc network, and wherein the particular autonomous vehicle to automatically announce itself as a first node in the adjacent ad-hoc network when it is a first vehicle currently in the adjacent ad-hoc network and a communication link between the existing ad-hoc network is broken because of distance from a node in the existing ad-hoc network.

16. The system of claim 15:

wherein each of autonomous vehicles in the existing ad-hoc network to serve as signal extenders by repeating a signal communication in the existing ad-hoc network to facilitate communication strength between autonomous vehicles in the existing ad-hoc network, and wherein each of the autonomous vehicles in the existing ad-hoc network to prefer communications through the existing ad-hoc network instead of communications to the central server when communicating commands related to at least one of a transient operational condition of each of the autonomous vehicles, operational instructions that are unlikely to be required beyond a current trip session of each of the autonomous vehicles, and based on a privacy preference of owners of each of the autonomous vehicles.

17. The system of claim 16:

wherein each of the owners of each of the autonomous vehicles optionally elect to opt-out of networked communications in any of the ad-hoc network and the centralized network.

18. The system of claim 10:

wherein adjacent ones of the set of autonomous vehicles automatically transmit emergency commands to the non-functional vehicle when the error condition is detected to permit the non-functional vehicle to enter a safe-mode and navigate to a safe parking location determined based on at least one of a visual mapping, a telemetric mapping, and a sensory fusion algorithm determining where exists the safe parking location, and wherein each of the set of autonomous vehicles is any one of a multi-rotor aircraft, a neighborhood rover, an autonomous boat, an autonomous submarine, and an autonomous passenger vehicle.

19. A method, comprising:

establishing peer-to-peer communication sessions between nearby ones of a set of autonomous vehicles operating in a geographically proximate area, through an ad-hoc network, based on a present geo-spatial location of each one of the set of autonomous vehicles in communication proximity to preferred adjacent ones of the set of autonomous vehicles;

establishing, using a central server directly coupled to each of the set of autonomous vehicles, centralized communication paths with each of the set of autonomous vehicles through a wide area network, processing a communication from adjacent ones of the set of autonomous vehicles using the centralized server when an error condition is detected in an operational mode of a non-functional vehicle that has lost communication with the central server due to at least one of a network failure, a hardware failure, a mechanical failure, and an electrical failure, and establishing the communication sessions established between the adjacent ones of the set of autonomous vehicles in a manner that provides at least one of a geo-spatial data, a status data, and a telemetry data to adjacent vehicles in the ad-hoc network through a redundant array of independent disk based algorithm based on at least one of an XOR method of recreating data stored on each of the adjacent vehicles operating in a present geo-spatial area defining each of the adjacent ones of the set of autonomous vehicles.

20. The method of claim 19, further comprising:

basing a communication preference between each of the adjacent ones of the set of autonomous vehicles on a closest physical proximity of active ones of the set of autonomous vehicles.

21. The method of claim 19, further comprising:

enabling adjacent ones of the set of autonomous vehicles to periodically refresh local indexes of available adjacent ones of the set of autonomous vehicles in a manner such that the adjacent ones of the set of autonomous vehicles minimize local storage requirements associated with ones of the set of autonomous vehicles that are no longer adjacent based on a changed location of adjacent ones of the set of autonomous vehicles through state based logic that determines which adjacent ones of the set of autonomous vehicles have presently moved into an adjacently established ad-hoc network comprising a different set of adjacent ones of the set of autonomous vehicles.

22. The method of claim 21, further comprising:

permitting each of the ad-hoc networks to maintain a unique identifier in a network identification table that is published to the central server and associated adjacent ad-hoc networks, wherein each of the ad-hoc networks maintain a geo-fenced region through which each ad-hoc network operates and shares geo-fence data with adjacent ad-hoc networks to minimize network geo-spatial overlap between adjacent ad-hoc network.

23. The method of claim 19, further comprising:

enabling the unique identifiers of the ad-hoc networks to automatically persist at a geo-defined area such that each of the ad-hoc networks are associated unique identifiers associated with a geo-defined region in which autonomous vehicles enter and depart; and enabling adjacent ones of the set of autonomous vehicles to automatically transmit emergency commands to the non-functional vehicle when the error condition is detected to permit the non-functional vehicle to enter a safe-mode and navigate to a safe parking location determined based on at least one of a visual mapping, a telemetric mapping, and a sensory fusion algorithm determining where exists the safe parking location, wherein each of the set of autonomous vehicles is any one of a multi-rotor aircraft, a neighborhood rover, an autonomous boat, an autonomous submarine, and an autonomous passenger vehicle.

24. The method of claim 23:

wherein a particular autonomous vehicle to determine if there exists a threshold number of other autonomous vehicles in a particular ad-hoc network when determining whether the particular autonomous vehicle should leave an existing ad-hoc network of the particular autonomous vehicle in a favor of an adjacent ad-hoc network to the existing ad-hoc network, and wherein the particular autonomous vehicle to automatically announce itself as a first node in the adjacent ad-hoc network when it is a first vehicle currently in the adjacent ad-hoc network and a communication link between the existing ad-hoc network is broken because of distance from a node in the existing ad-hoc network.

25. The system of claim 24:

wherein each of autonomous vehicles in the existing ad-hoc network to serve as signal extenders by repeating a signal communication in the existing ad-hoc network to facilitate communication strength between autonomous vehicles in the existing ad-hoc network, and wherein each of the autonomous vehicles in the existing ad-hoc network to prefer communications through the existing ad-hoc network instead of communications to the central server when communicating commands related to at least one of a transient operational condition of each of the autonomous vehicles, operational instructions that are unlikely to be required beyond a current trip session of each of the autonomous vehicles, and based on a privacy preference of owners of each of the autonomous vehicles.

26. The system of claim 25:

wherein each of the owners of each of the autonomous vehicles optionally elect to opt-out of networked communications in any of the ad-hoc network and the centralized network.

27. The system of claim 19:

wherein adjacent ones of the set of autonomous vehicles automatically transmit emergency commands to the non-functional vehicle when the error condition is detected to permit the non-functional vehicle to enter a safe-mode and navigate to a safe parking location determined based on at least one of a visual mapping, a telemetric mapping, and a sensory fusion algorithm determining where exists the safe parking location, and wherein each of the set of autonomous vehicles is any one of a multi-rotor aircraft, a neighborhood rover, an autonomous boat, an autonomous submarine, and an autonomous passenger vehicle.

28. A system, comprising:

an ad-hoc network;

a set of autonomous vehicles operating in a geographically proximate area through which peer-to-peer communication sessions are established between nearby ones of the set of autonomous vehicles through the ad-hoc network based on a present geo-spatial location of each one of the set of autonomous vehicles in communication proximity to preferred adjacent ones of the set of autonomous vehicles;

a wide area network; and a central server directly coupled to each of the set of autonomous vehicles to establish centralized communication paths with each of the set of autonomous vehicles through the wide area network, wherein the centralized server to process a communication from adjacent ones of the set of autonomous vehicles when an error condition is detected in an operational mode of a non-functional vehicle that has lost communication with the central server due to at least one of a network failure, a hardware failure, a mechanical failure, and an electrical failure, and wherein adjacent ones of the set of autonomous vehicles periodically refresh local indexes of available adjacent ones of the set of autonomous vehicles in a manner such that the adjacent ones of the set of autonomous vehicles minimize local storage requirements associated with ones of the set of autonomous vehicles that are no longer adjacent based on a changed location of adjacent ones of the set of autonomous vehicles through state based logic that determines which adjacent ones of the set of autonomous vehicles have presently moved into an adjacently established ad-hoc network comprising a different set of adjacent ones of the set of autonomous vehicles.

29. The system of claim 28:

wherein a communication preference between each of the adjacent ones of the set of autonomous vehicles in the ad hoc network is based on a closest physical proximity of active ones of the set of autonomous vehicles.

30. The system of claim 28:

wherein each of the ad-hoc networks maintain a unique identifier in a network identification table that is published to the central server and associated adjacent ad-hoc networks, and wherein each of the ad-hoc networks maintain a geo-fenced region through which each ad-hoc network operates and shares geo-fence data with adjacent ad-hoc networks to minimize network geo-spatial overlap between adjacent ad-hoc networks.

31. The system of claim 30:

wherein each of the unique identifiers of the ad-hoc networks to automatically persist at a geo-defined area such that each of the ad-hoc networks are associated unique identifiers associated with a geo-defined region in which autonomous vehicles enter and depart.

32. The system of claim 31:

wherein a particular autonomous vehicle to determine if there exists a threshold number of other autonomous vehicles in a particular ad-hoc network when determining whether the particular autonomous vehicle should leave an existing ad-hoc network of the particular autonomous vehicle in a favor of an adjacent ad-hoc network to the existing ad-hoc network, and wherein the particular autonomous vehicle to automatically announce itself as a first node in the adjacent ad-hoc network when it is a first vehicle currently in the adjacent ad-hoc network and a communication link between the existing ad-hoc network is broken because of distance from a node in the existing ad-hoc network.

33. The system of claim 32:

wherein each of autonomous vehicles in the existing ad-hoc network to serve as signal extenders by repeating a signal communication in the existing ad-hoc network to facilitate communication strength between autonomous vehicles in the existing ad-hoc network, and wherein each of the autonomous vehicles in the existing ad-hoc network to prefer communications through the existing ad-hoc network instead of communications to the central server when communicating commands related to at least one of a transient operational condition of each of the autonomous vehicles, operational instructions that are unlikely to be required beyond a current trip session of each of the autonomous vehicles, and based on a privacy preference of owners of each of the autonomous vehicles.

34. The system of claim 33:

wherein each of the owners of each of the autonomous vehicles optionally elect to opt-out of networked communications in any of the ad-hoc network and the centralized network.

35. The system of claim 28:

wherein adjacent ones of the set of autonomous vehicles automatically transmit emergency commands to the non-functional vehicle when the error condition is detected to permit the non-functional vehicle to enter a safe-mode and navigate to a safe parking location determined based on at least one of a visual mapping, a telemetric mapping, and a sensory fusion algorithm determining where exists the safe parking location, and wherein each of the set of autonomous vehicles is any one of a multi-rotor aircraft, a neighborhood rover, an autonomous boat, an autonomous submarine, and an autonomous passenger vehicle.

36. A system, comprising:

an ad-hoc network;

a set of autonomous vehicles operating in a geographically proximate area through which peer-to-peer communication sessions are established between nearby ones of the set of autonomous vehicles through the ad-hoc network based on a present geo-spatial location of each one of the set of autonomous vehicles in communication proximity to preferred adjacent ones of the set of autonomous vehicles;

a wide area network; and a central server communicatively coupled with each of the set of autonomous vehicles to establish centralized communication paths with each of the set of autonomous vehicles through the wide area network, wherein the centralized server to process a communication from adjacent ones of the set of autonomous vehicles when an error condition is detected in an operational mode of a non-functional vehicle that has lost communication with the central server, wherein a communication preference between each of the adjacent ones of the set of autonomous vehicles is based on a closest physical proximity of active ones of the set of autonomous vehicles, and wherein adjacent ones of the set of autonomous vehicles periodically refresh local indexes of available adjacent ones of the set of autonomous vehicles in a manner such that the adjacent ones of the set of autonomous vehicles minimize local storage requirements associated with ones of the set of autonomous vehicles that are no longer adjacent based on a changed location of adjacent ones of the set of autonomous vehicles through state based logic that determines which adjacent ones of the set of autonomous vehicles have presently moved into an adjacently established ad-hoc network comprising a different set of adjacent ones of the set of autonomous vehicles.

37. The system of claim 36:

wherein the lost communication is due to at least one of a network failure, a hardware failure, a mechanical failure, and an electrical failure.

38. The system of claim 36:

wherein each of the ad-hoc networks maintain a unique identifier in a network identification table that is published to the central server and associated adjacent ad-hoc networks, wherein each of the ad-hoc networks maintain a geo-fenced region through which each ad-hoc network operates and shares geo-fence data with adjacent ad-hoc networks to minimize network geo-spatial overlap between adjacent ad-hoc network.

39. The system of claim 38:

wherein each of the unique identifiers of the ad-hoc networks to automatically persist at a geo-defined area such that each of the ad-hoc networks are associated unique identifiers associated with a geo-defined region in which autonomous vehicles enter and depart.

40. The system of claim 39:

wherein a particular autonomous vehicle to determine if there exists a threshold number of other autonomous vehicles in a particular ad-hoc network when determining whether the particular autonomous vehicle should leave an existing ad-hoc network of the particular autonomous vehicle in a favor of an adjacent ad-hoc network to the existing ad-hoc network, and wherein the particular autonomous vehicle to automatically announce itself as a first node in the adjacent ad-hoc network when it is a first vehicle currently in the adjacent ad-hoc network and a communication link between the existing ad-hoc network is broken because of distance from a node in the existing ad-hoc network.

41. The system of claim 40:

wherein each of autonomous vehicles in the existing ad-hoc network to serve as signal extenders by repeating a signal communication in the existing ad-hoc network to facilitate communication strength between autonomous vehicles in the existing ad-hoc network, and wherein each of the autonomous vehicles in the existing ad-hoc network to prefer communications through the existing ad-hoc network instead of communications to the central server when communicating commands related to at least one of a transient operational condition of each of the autonomous vehicles, operational instructions that are unlikely to be required beyond a current trip session of each of the autonomous vehicles, and based on a privacy preference of owners of each of the autonomous vehicles.

42. The system of claim 41:

wherein each of the owners of each of the autonomous vehicles optionally elect to opt-out of networked communications in any of the ad-hoc network and the centralized network.

43. The system of claim 36:

wherein adjacent ones of the set of autonomous vehicles automatically transmit emergency commands to the non-functional vehicle when the error condition is detected to permit the non-functional vehicle to enter a safe-mode and navigate to a safe parking location determined based on at least one of a visual mapping, a telemetric mapping, and a sensory fusion algorithm determining where exists the safe parking location, and wherein each of the set of autonomous vehicles is any one of a multi-rotor aircraft, a neighborhood rover, an autonomous boat, an autonomous submarine, and an autonomous passenger vehicle.

44. A method, comprising:

establishing peer-to-peer communication sessions between nearby ones of a set of autonomous vehicles operating in a geographically proximate area, through an ad-hoc network, based on a present geo-spatial location of each one of the set of autonomous vehicles in communication proximity to preferred adjacent ones of the set of autonomous vehicles;

establishing, using a central server directly coupled to each of the set of autonomous vehicles, centralized communication paths with each of the set of autonomous vehicles through a wide area network;

processing a communication from adjacent ones of the set of autonomous vehicles using the centralized server when an error condition is detected in an operational mode of a non-functional vehicle that has lost communication with the central server due to at least one of a network failure, a hardware failure, a mechanical failure, and an electrical failure; and enabling adjacent ones of the set of autonomous vehicles to periodically refresh local indexes of available adjacent ones of the set of autonomous vehicles in a manner such that the adjacent ones of the set of autonomous vehicles minimize local storage requirements associated with ones of the set of autonomous vehicles that are no longer adjacent based on a changed location of adjacent ones of the set of autonomous vehicles through state based logic that determines which adjacent ones of the set of autonomous vehicles have presently moved into an adjacently established ad-hoc network comprising a different set of adjacent ones of the set of autonomous vehicles.

45. The method of claim 44, further comprising:

basing a communication preference between each of the adjacent ones of the set of autonomous vehicles on a closest physical proximity of active ones of the set of autonomous vehicles.

46. The method of claim 44, further comprising:

permitting each of the ad-hoc networks to maintain a unique identifier in a network identification table that is published to the central server and associated adjacent ad-hoc networks, wherein each of the ad-hoc networks maintain a geo-fenced region through which each ad-hoc network operates and shares geo-fence data with adjacent ad-hoc networks to minimize network geo-spatial overlap between adjacent ad-hoc network.

47. The method of claim 44, further comprising:

enabling the unique identifiers of the ad-hoc networks to automatically persist at a geo-defined area such that each of the ad-hoc networks are associated unique identifiers associated with a geo-defined region in which autonomous vehicles enter and depart; and enabling adjacent ones of the set of autonomous vehicles to automatically transmit emergency commands to the non-functional vehicle when the error condition is detected to permit the non-functional vehicle to enter a safe-mode and navigate to a safe parking location determined based on at least one of a visual mapping, a telemetric mapping, and a sensory fusion algorithm determining where exists the safe parking location, wherein each of the set of autonomous vehicles is any one of a multi-rotor aircraft, a neighborhood rover, an autonomous boat, an autonomous submarine, and an autonomous passenger vehicle.

48. The method of claim 47:

wherein a particular autonomous vehicle to determine if there exists a threshold number of other autonomous vehicles in a particular ad-hoc network when determining whether the particular autonomous vehicle should leave an existing ad-hoc network of the particular autonomous vehicle in a favor of an adjacent ad-hoc network to the existing ad-hoc network, and wherein the particular autonomous vehicle to automatically announce itself as a first node in the adjacent ad-hoc network when it is a first vehicle currently in the adjacent ad-hoc network and a communication link between the existing ad-hoc network is broken because of distance from a node in the existing ad-hoc network.

49. The system of claim 48:

wherein each of autonomous vehicles in the existing ad-hoc network to serve as signal extenders by repeating a signal communication in the existing ad-hoc network to facilitate communication strength between autonomous vehicles in the existing ad-hoc network, and wherein each of the autonomous vehicles in the existing ad-hoc network to prefer communications through the existing ad-hoc network instead of communications to the central server when communicating commands related to at least one of a transient operational condition of each of the autonomous vehicles, operational instructions that are unlikely to be required beyond a current trip session of each of the autonomous vehicles, and based on a privacy preference of owners of each of the autonomous vehicles.

50. The system of claim 49:

wherein each of the owners of each of the autonomous vehicles optionally elect to opt-out of networked communications in any of the ad-hoc network and the centralized network.

51. The system of claim 44:

wherein adjacent ones of the set of autonomous vehicles automatically transmit emergency commands to the non-functional vehicle when the error condition is detected to permit the non-functional vehicle to enter a safe-mode and navigate to a safe parking location determined based on at least one of a visual mapping, a telemetric mapping, and a sensory fusion algorithm determining where exists the safe parking location, and wherein each of the set of autonomous vehicles is any one of a multi-rotor aircraft, a neighborhood rover, an autonomous boat, an autonomous submarine, and an autonomous passenger vehicle.

* * * * *